United States Patent
Kitajima

(10) Patent No.: US 8,937,669 B2
(45) Date of Patent: Jan. 20, 2015

(54) IMAGE PROCESSING APPARATUS, CONTROL METHOD THEREOF, AND PROGRAM

(75) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 13/220,009

(22) Filed: Aug. 29, 2011

(65) Prior Publication Data

US 2012/0050561 A1 Mar. 1, 2012

(30) Foreign Application Priority Data

Sep. 1, 2010 (JP) .................. 2010-195634

(51) Int. Cl.
*H04N 5/76* (2006.01)
*H04N 5/262* (2006.01)
*H04N 1/00* (2006.01)
*G06F 17/30* (2006.01)
*G06K 9/00* (2006.01)
*H04N 1/21* (2006.01)
(Continued)

(52) U.S. Cl.
CPC ...... *H04N 1/00408* (2013.01); *G06F 17/30265* (2013.01); *G06K 9/00664* (2013.01); *H04N 1/00244* (2013.01); *H04N 1/00326* (2013.01); *H04N 1/00453* (2013.01); *H04N 1/00461* (2013.01); *H04N 1/00477* (2013.01); *H04N 1/2112* (2013.01); *H04N 1/2125* (2013.01); *H04N 1/2179* (2013.01); *H04N 1/2187* (2013.01); *H04N 1/2191* (2013.01); *H04N 1/32128* (2013.01); *H04N 2101/00* (2013.01); *H04N 2201/0039* (2013.01); *H04N 2201/3253* (2013.01); *H04N 2201/3274* (2013.01); *H04N 2201/3278* (2013.01); *H04N 2201/328* (2013.01); *H04N 2201/3284* (2013.01)
USPC .......................... 348/231.6; 348/239

(58) Field of Classification Search
CPC ............... H04N 5/23222; G06F 17/30244; G06F 17/3025; G06F 17/30253; G06F 17/30256; G06F 17/30259
USPC ............ 348/116, 207.1, 222.1, 231.3, 231.6, 348/239, 333.02, 333.03, 333.04
See application file for complete search history.

(56) References Cited

U.S. PATENT DOCUMENTS 6,690,883 B2 * 2/2004 Pelletier ..................... 396/321
8,094,974 B2 * 1/2012 Hisatomi et al. ........... 382/306
(Continued)

FOREIGN PATENT DOCUMENTS

| CN | 1834986 A | 9/2006 |
|---|---|---|
| CN | 101064004 A | 10/2007 |

(Continued)

*Primary Examiner* — Daniel M Pasiewicz
(74) *Attorney, Agent, or Firm* — Canon USA, Inc., IP Division

(57) ABSTRACT

An image processing apparatus includes a first acquisition unit configured to acquire positional information indicating a photographing position of an image, a second acquisition unit configured to acquire photographic information on photographing of the image, a determination unit configured to determine reliability which indicates a level of the positional information acquired by the first acquisition means indicating a photographing position of contents expressed by the image based on the photographic information acquired by the second acquisition means, and an associating unit configured to associate the reliability determined by the determination means with the image.

12 Claims, 24 Drawing Sheets

(51) Int. Cl.
*H04N 1/32* (2006.01)
*H04N 101/00* (2006.01)

(56) References Cited

U.S. PATENT DOCUMENTS

| | | | |
|---|---|---|---|
| 8,421,872 B2 * | 4/2013 | Neven, Sr. | 348/222.1 |
| 8,477,994 B1 * | 7/2013 | Noshadi | 382/103 |
| 2004/0117367 A1 | 6/2004 | Smith | |
| 2004/0135890 A1 * | 7/2004 | Kaneko et al. | 348/207.1 |
| 2004/0148564 A1 | 7/2004 | Takata | |
| 2006/0093183 A1 | 5/2006 | Hosoi | |
| 2007/0253604 A1 | 11/2007 | Inoue | |
| 2008/0192980 A1 | 8/2008 | Park | |
| 2008/0219505 A1 | 9/2008 | Morimitsu | |
| 2008/0226130 A1 | 9/2008 | Kansal | |
| 2008/0317346 A1 * | 12/2008 | Taub | 382/182 |
| 2010/0158319 A1 | 6/2010 | Jung | |
| 2010/0312519 A1 * | 12/2010 | Huang et al. | 702/150 |

FOREIGN PATENT DOCUMENTS

| | | |
|---|---|---|
| JP | 2001-043496 A | 2/2001 |
| JP | 2004-194174 A | 7/2004 |
| JP | 2004191339 A | 7/2004 |

* cited by examiner

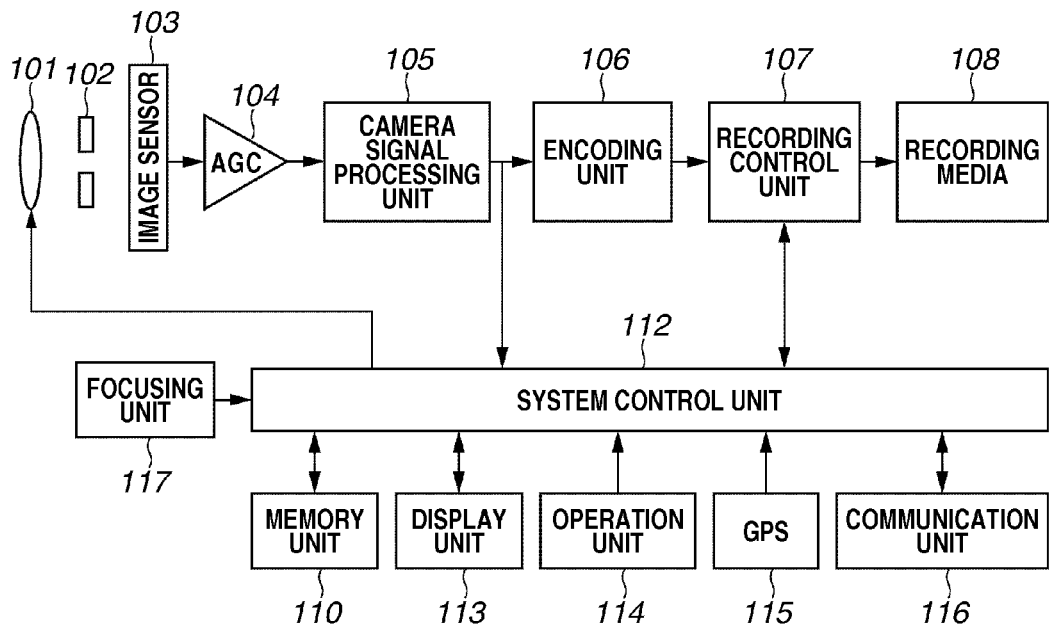
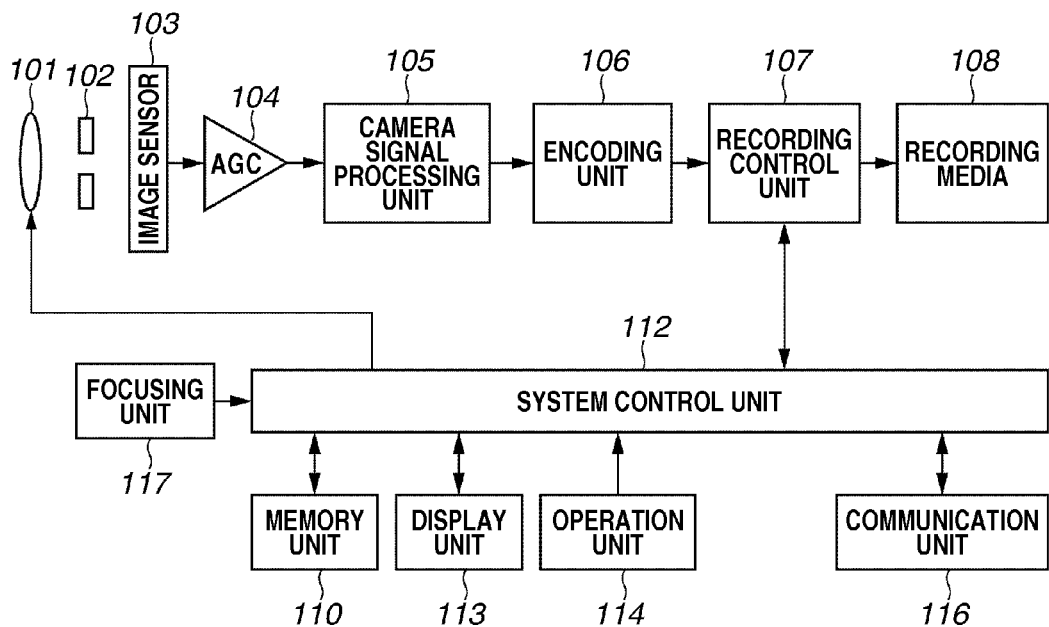

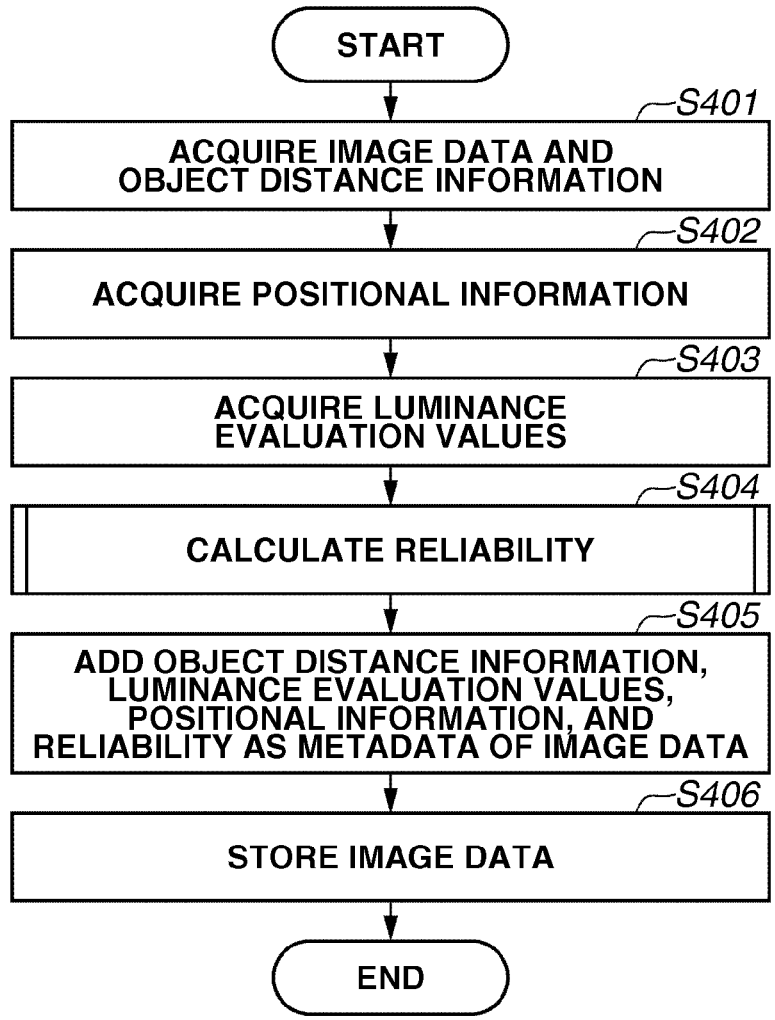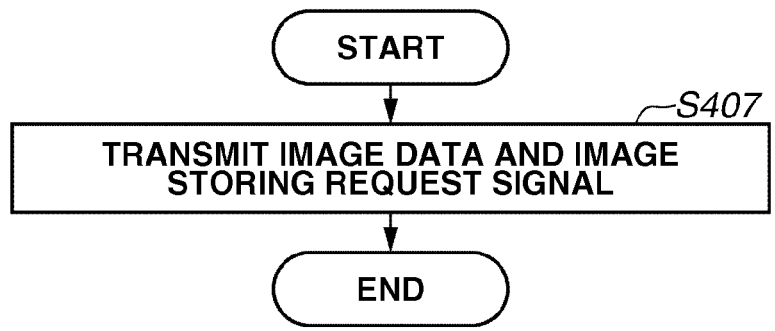

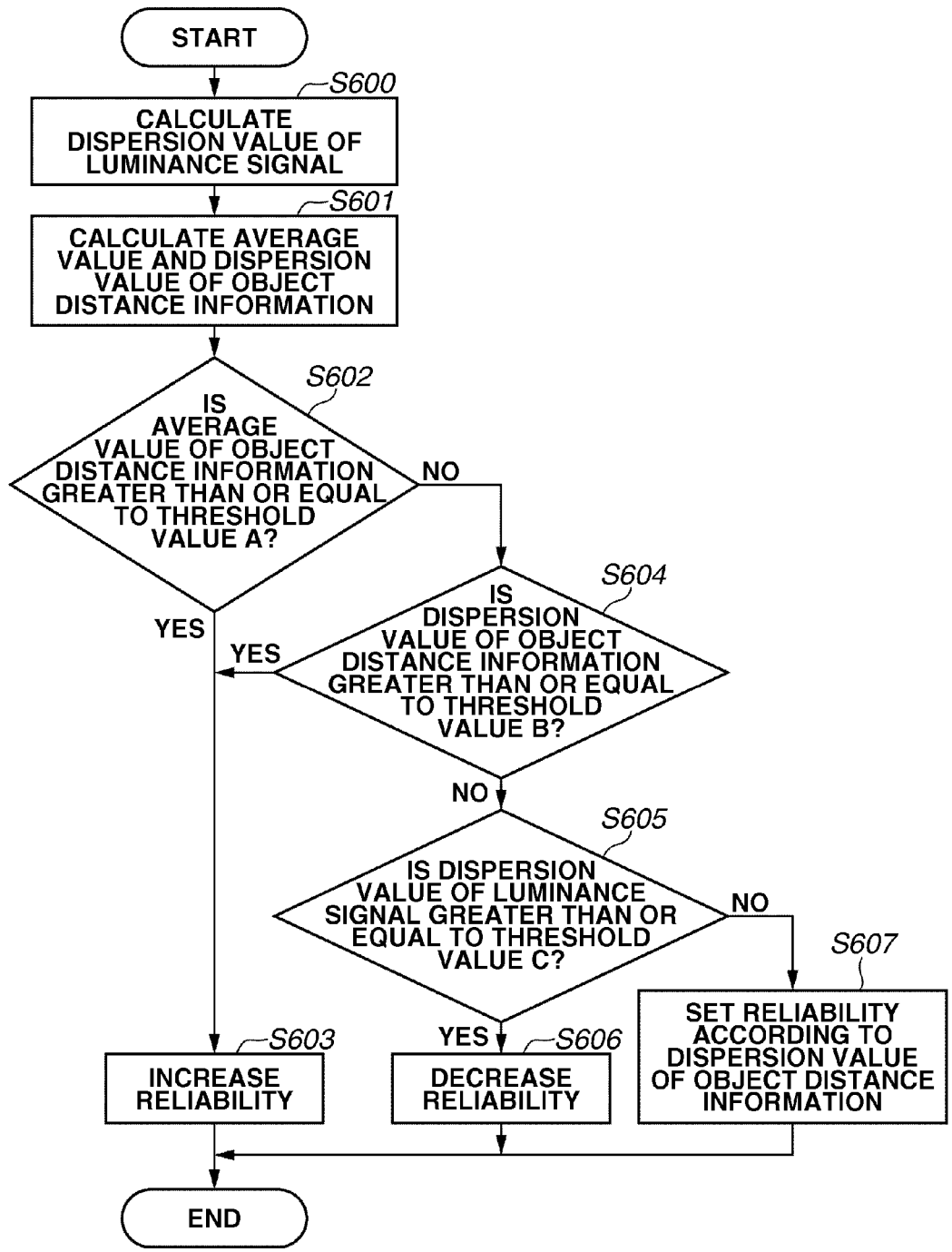

FIG.8

MANUFACTURER NAME: XXX

MODEL NAME: CAMERAXX

DATE AND TIME OF PHOTOGRAPHING: 2010/04/○○ 16:15

IMAGE SIZE: 4000 × 2000

⋮

POSITIONAL INFORMATION

LATITUDE: XX,XX,XX
LONGITUDE: XX,XX,XX

~801

RELIABILITY OF OBJECT POSITION 0.7  ~802

⋮

IMAGE PROCESSING APPARATUS, CONTROL METHOD THEREOF, AND PROGRAM

BACKGROUND OF THE INVENTION

1. Field of the Invention

The present invention relates to an image processing apparatus capable of associating an image with positional information indicating where the image has been photographed, a control method thereof, and a recording medium that records a program.

2. Description of the Related Art

Conventionally, there is a technique related to a system which searches, when image data whose photographing position is unclear is input, similar image data and outputs the positional information on where the similar image data has been photographed. As a result, a user can acquire the photographing position of the image data whose photographing position has been unclear.

For example, Japanese Patent Application Laid-Open No. 2004-191339 discusses the following technique. When the image data photographed by an imaging apparatus is input, a feature component is extracted from the image data. A similar image is then searched from a database based on the extracted feature component, and the positional information, i.e., the search result is notified to a user.

However, the technique discussed in Japanese Patent Application Laid-Open No. 2004-191339 does not consider whether the positional information of the similar image data in the database to be searched is information that matches the content of the image.

For example, the positional information added to an image is often different between a case where the positional information is acquired by actually photographing an object and a case there the positional information acquired by photographing a photograph of the object. Further, the positional information added to the image in the later case is usually unrelated to the actual position of the object.

However, since the same object is photographed in the image of the later case and in the image of the former case, the user may be notified of the positional information added to the image of the later case as the search result of the positional information. As described above, if there is image data to which the positional information not related to the content of the image is added among the image data pieces registered in the database, the user may be notified of the positional information not expected by the user.

SUMMARY OF THE INVENTION

The present invention is directed to providing positional information of higher accuracy to be associated with image data of a photographed image.

According to an aspect of the present invention, an image processing apparatus includes a first acquisition unit configured to acquire positional information indicating a photographing position where an object has been photographed, a second acquisition unit configured to acquire photographic information based on photographic image data of the object, a determination unit configured to determine a reliability value which indicates how the positional information indicates a photographing position of contents expressed by the photographic image data based on the photographic information acquired by the second acquisition unit, and an associating unit configured to associate the reliability value determined by the determination unit with the photographic image data of the object.

According to an aspect of the present invention, positional information of higher accuracy can be provided which is associated with the image data of the photographed image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2A is a block diagram illustrating a configuration of a camera 100, and FIG. 2B is a block diagram illustrating a configuration of a camera 200 according to the first exemplary embodiment of the present invention.

FIGS. 4A and 4B are flowcharts illustrating operations performed by the camera according to the first exemplary embodiment of the present invention.

FIG. 6 is a flowchart illustrating a process for calculating reliability according to the first exemplary embodiment of the present invention.

FIG. 8 illustrates metadata to be added according to the first exemplary embodiment of the present invention.

DESCRIPTION OF THE EMBODIMENTS

Various exemplary embodiments, features, and aspects of the invention will be described in detail below with reference to the drawings.

Figure 1:
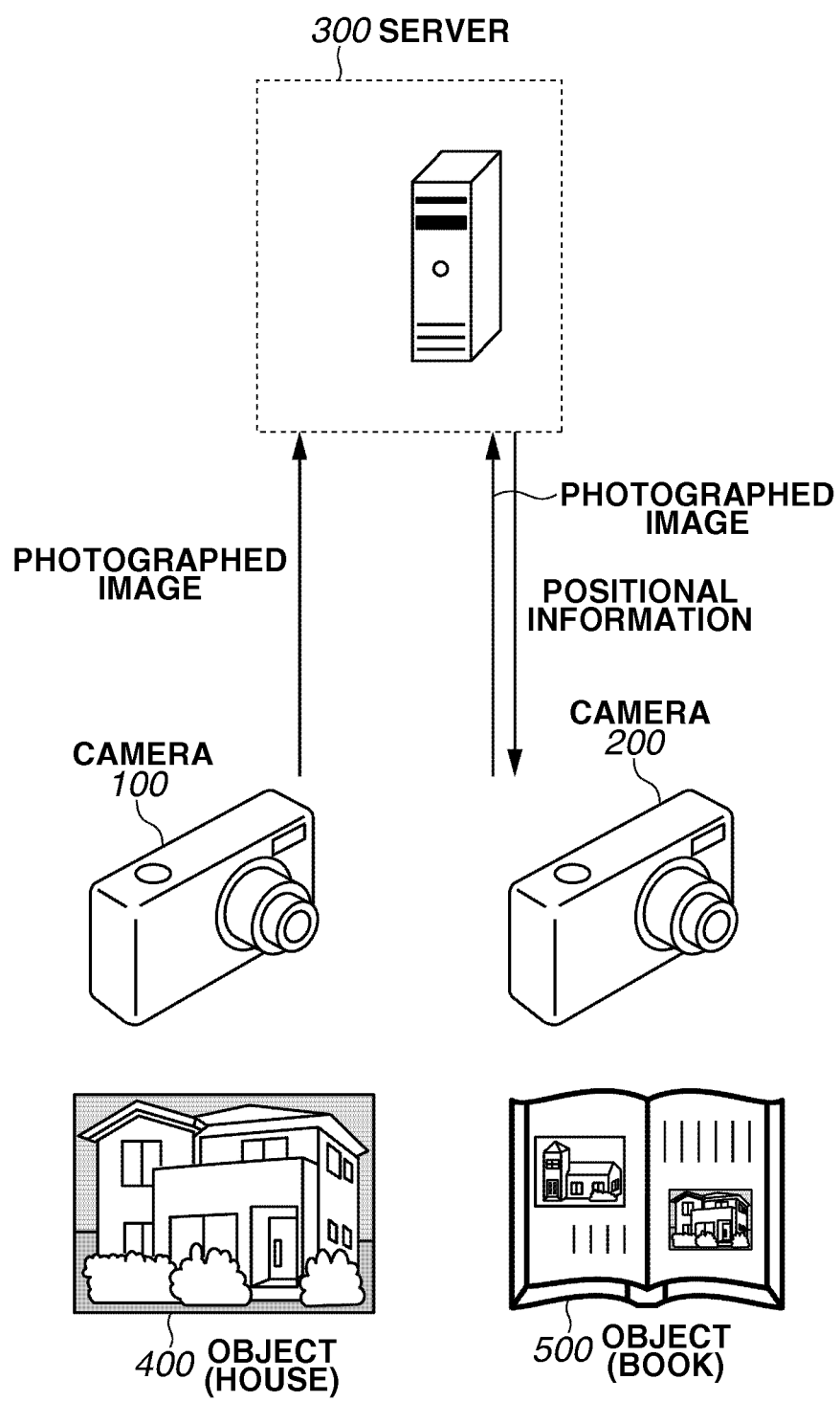
FIG. 1 illustrates an example of a system according to a first exemplary embodiment of the present invention.

FIG. 1 illustrates an example of a system to which the first exemplary embodiment according to the present invention is applied.

Referring to FIG. 1, a camera 100 is an example of an image processing apparatus in which a global positioning system (GPS) is installed. A server 300 transmits and receives information to and from the camera. A camera 200 is an example of an image processing apparatus in which the GPS is not installed. An object (house) 400 is an example of the object photographed by the camera 100. On the other hand, an object (book) 500 is an example of the object photographed by the camera 200.

FIG. 2A is a block diagram illustrating a configuration example of the camera 100 according to the present exemplary embodiment.

Referring to FIG. 2A, a lens 101 collects a light flux from the object. An iris 102 regulates incident light. An image sensor 103 performs photoelectric conversion of the light entered via the lens 101 and the iris 102, and outputs the result as an input image signal. An automatic gain control (AGC) amplifier 104 amplifies the image signal output from the image sensor 103 to an appropriate level, and outputs the amplified signal to a camera signal processing unit 105.

The camera signal processing unit 105 performs gamma correction and contour enhancement correction with respect to the signal generated by the image sensor 103. The camera signal processing unit 105 then outputs the corrected image signal to an encoding unit 106. The encoding unit 106 performs compression and coding on the image signal processed in the camera signal processing unit 105. For example, the image signal is compressed and coded based on standards such as joint photographic experts group (JPEG) and moving picture experts group (MPEG). The encoding unit 106 then transmits the encoded image data to a recording control unit 107. The recording control unit 107 controls recording of the image data encoded by the encoding unit 106 in recording media 108.

The recording media 108 is one type of a recording medium that records the image data. The recording media 108 maybe detachably attached to the camera 100, or may be embedded in the camera 100. A memory unit 110 includes a random access memory (RAM) and an electrically erasable read-only memory (EEPROM). The memory unit 110 stores programs to be executed by a system control unit 112 to be described below. The memory unit 110 is used for expanding a read program. The above-described programs are programs for executing various flowcharts to be described below.

The system control unit 112 controls the operations performed by the camera 100 based on the signals input from each unit or the programs. For example, the system control unit 112 drives a focus lens in the lens 101 to focus on the object. Further, the system control unit 112 calculates the reliability to be described below. The control performed in the camera 100 may be performed by single hardware or by a plurality of hardware units sharing the processes.

A display unit 113 such as a liquid crystal panel displays the image data recorded on the recording media 108 or a through image when photographing. An operation unit 114 receives a user operation. A GPS 115 receives a signal from a GPS satellite and acquires the positional information which is one of the photographic information. A communication unit 116 communicates with an external device.

A focusing unit 117 includes a distance sensor and a control unit thereof. The focusing unit 117 measures a distance to a plurality of points in the object, and outputs object distance information indicating the distance between the camera 100 and the object.

Figure 7A:
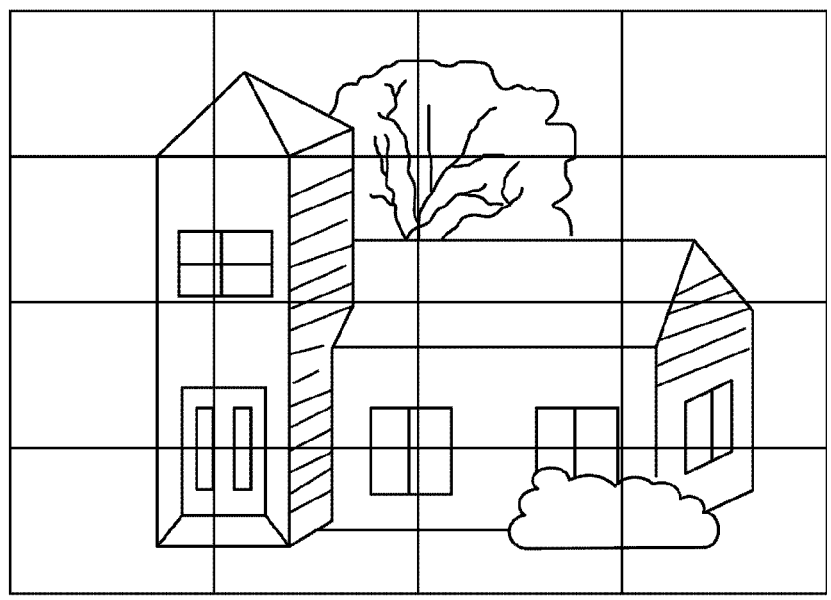
FIGS. 7A and 7B illustrate object distance information and luminance evaluation values according to the first exemplary embodiment of the present invention.
Figure 7B:
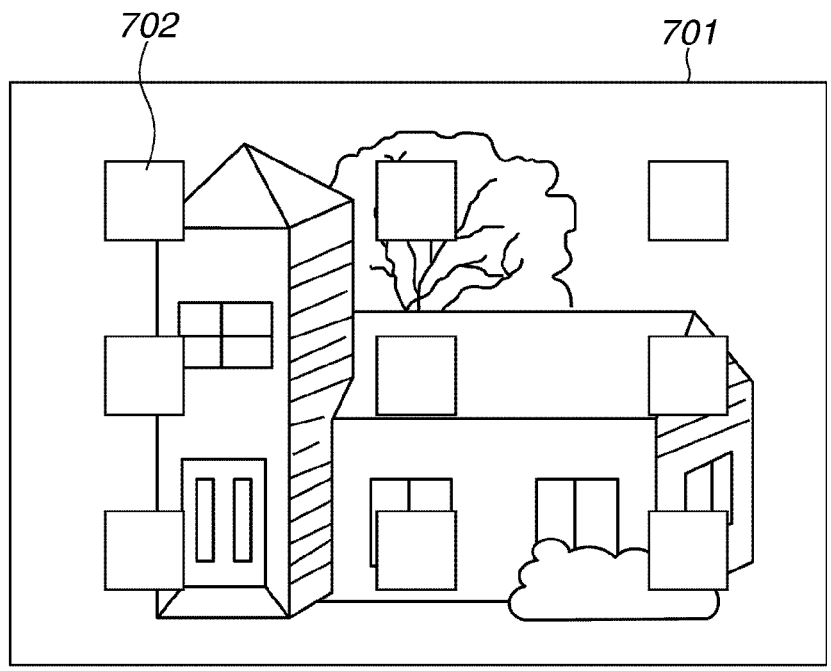

A method for acquiring the object distance information according to the present exemplary embodiment will be described below. FIG. 7B illustrates a photographing range 701 and focusing points 702. The focusing unit 117 calculates the distance between the object and the camera with respect to 3*3, i.e., 9 focus points 702 in the photographing range 701. The object distance may be calculated using a known method.

For example, the object distance is calculated using an outer measure phase difference detection method. In such a case, the light flux received from the object is divided into two, and a line sensor receives each of the light fluxes divided into two. The focusing unit 117 then detects a displacement in the image formed on the line sensor, i.e., a phase difference, and calculates the object distance from the phase difference using a triangulation method. A specific method of acquiring the object distance information is as described above.

FIG. 2B is a block diagram illustrating a configuration example of the camera 200 according to the present exemplary embodiment. Referring to FIG. 2B, the configuration of the camera 200 is similar to that of the camera 100 illustrated in FIG. 2A except for the GPS 115 not being included in the camera 200.

Figure 3:
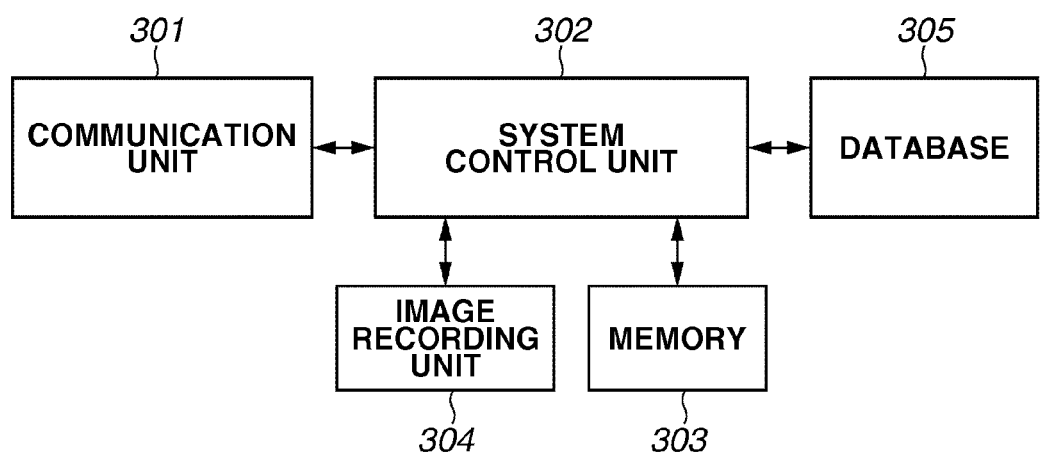
FIG. 3 is a block diagram illustrating a configuration of a server according to the first exemplary embodiment of the present invention.

FIG. 3 is a block diagram illustrating a configuration example of the server 300 according to the present exemplary embodiment. Referring to FIG. 3, a communication unit 301 communicates with the external devices. For example, the communication unit 301 communicates with the camera 100 and the camera 200. A system control unit 302 controls the operations of the entire server 300 based on the signals input from each unit and the programs. For example, the system control unit 302 registers the image data recorded in an image recording unit 304 to an image database (hereinafter referred to as an image DB) 305 to be described below, and performs a similar image search to be described below.

A memory unit 303 which includes the RAM and the EEPROM stores the programs to be executed by the system control unit 302. Further, the memory unit 303 is used for expanding the read programs. The above-described programs are programs for executing various flowcharts to be described below.

The image recording unit 304 records the image data received from the camera 100 via the communication unit 301. The image data recorded in the image recording unit 304 can be arbitrarily viewed by large groups of users. For example, the image data can be viewed using an external information processing apparatus (not illustrated) including a display unit, an operation unit, and a communication unit.

The display unit in the external information processing apparatus displays a list of the image data pieces stored in the image recording unit 304, acquired via the communication unit. The user then selects the image data via the operation unit, so that the image data stored in the image recording unit 304 is displayed on the display unit. Accordingly, the user can view the arbitrary image data.

The image DB 305 is a recording device such as a large-capacity hard disk drive (HDD). The system control unit 302 registers in the image DB 305, only a specific type of image data among the image data pieces stored in the image recording unit 304. According to the present exemplary embodiment, the image data is registered by storing the image data recorded in the image recording unit 304 and the metadata thereof in the image DB 305.

A list of storing locations of the image data pieces recorded in the image recording unit 304 may be stored in the image DB 305 instead of the image data recorded in the image recording unit 304 and metadata thereof. The system control unit 302 searches among the image data pieces registered in the image DB 305 for image data similar to the image data received from the camera 200.

An example of the user acquiring the positional information using the above-described system will be described below.

An outline of a basic operation performed by the present system will be described below. According to the present exemplary embodiment, a case will be described in which the user of the camera 200 searches for an actual position of the object (house) 400 based on the photograph of the object (house) 400 shown in the object (book) 500.

The server 300 including the image DB 305 is used for the search. The image data in which the object (house) 400 is photographed, transmitted from the camera 100, is registered in the image DB 305. The user photographs the object (house) 400 in the object (book) 500 using the camera 200. The photographed image data is transmitted to the server 300.

Upon receiving the image data, the server 300 searches in the image data pieces registered in the image DB 305 for the image data in which the object (house) 400 is photographed. The server 300 then transmits to the camera 200, the positional information added to the searched image data. The user can thus be informed of the position of the object (house) 400 using such service. The basic operation performed by the present system is as described above.

The process for registering the image data photographed by the camera 100 in the image DB 305 will be described below.

Upon the camera 100 photographing the object (house) 400, the recording control unit 107 receives the photographed image data from the encoding unit 106. The focusing unit 117 calculates the object distance information. The system control unit 112 then acquires, using the GPS 115, the positional information indicating the position of the camera 100 when photographing, and outputs the positional information to the recording control unit 107.

Further, the focusing unit 117 outputs to the system control unit 112, the object distance information as the photographic information. The camera signal processing unit 105 outputs to the system control unit 112, the luminance evaluation values as the photographic information. The system control unit 112 then calculates the reliability based on the luminance evaluation values input from the camera signal processing unit 105 and the object distance information input from the focusing unit 117.

The system control unit 112 outputs the calculated reliability to the recording control unit 107. The recording control unit 107 stores the input reliability in the recording media 108 associated with the image data along with the positional information.

The image data stored as described above is transmitted to the server 300 along with an image storing request signal, automatically or by the user operation. The image storing request signal is a signal for requesting the server 300 to store the image data transmitted with the image storing request signal in the image recording unit 304. As a result, the image data photographed by the camera 100 is stored in the image recording unit 304 in the server 300.

The reliability will be described below. The reliability indicates a level of an association between the positional information acquired by the GPS 115 and the content expressed by the photographed image data. The content expressed by the photograph may be said what is photographed in the image data. For example, the content expressed by the photograph of the object 500 is a house. The reliability becomes higher if the actual object is photographed. In contrast, if an output product such as a magazine or a book is photographed, the reliability becomes low. This is because the association between the photographing position and the content of the photographed image data becomes low when photographing the output product such as the magazine or the book.

Figure 5A:
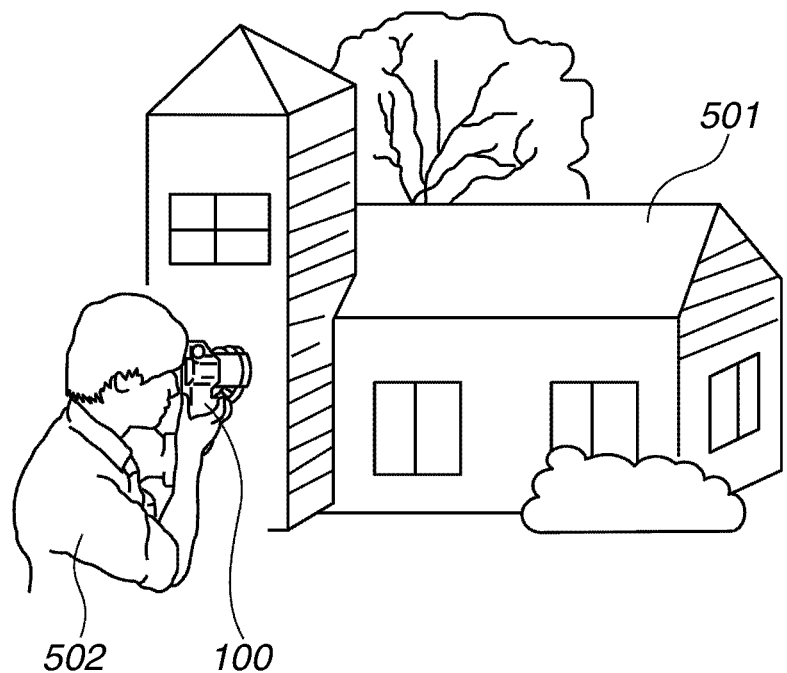
FIGS. 5A and 5B illustrate relationships between an object and a photographer according to the first exemplary embodiment of the present invention.

FIG. 5A illustrates an object 501 which is an actual building, a photographer 502, and the camera 100. Referring to FIG. 5A, if the photographer 502 is photographing the actual object 501 as the content, the recorded in the photographed image data at least indicates the position at which the object 501 can be photographed. There is thus an association between the positional information and the object 501, so that the reliability becomes high.

Figure 5B:
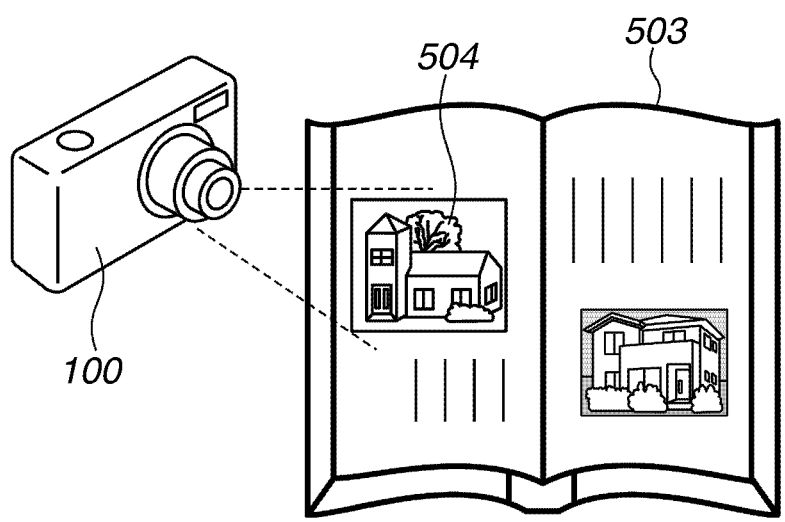

On the other hand, FIG. 5B illustrates a photograph 504 included in a book 503 being photographed by the camera 100. The object 501 is photographed in the photograph 504. In such a case, the positional information recorded when the camera 100 photographs the photograph 504 is the positional information indicating the position where the book 503 exists. However, the content of the image data is the object 501 photographed in the photograph 504.

In other words, despite the content expressed by the image data is the object 501, the positional information to be recorded is the positional information indicating the position where the book 503 exists. Therefore, the possibility that there is no association between the positional information and the object 501 becomes high, so that the reliability becomes low. The concept of reliability is as described above.

Returning to the flow for registering the image data photographed by the camera 100 in the image DB 305, the server 300 receives the image data from the camera 100 and stores the image data in the image recording unit 304. The server 300 registers the image data of high reliability in the image DB 305 among the image data stored in the image recording unit 304.

A number of image data becomes registered in the image DB 305 as described above, so that the image data of high reliability becomes accumulated in the image DB 305. According to the present exemplary embodiment, the similar image search to be described below is performed using such image data of high reliability.

According to the above-described process, the image data is registered in the image DB 305.

The flow in which the camera 200 receives the actual position of the object (house) 400 from the server 300 will be described below.

The camera 200 photographs the photograph 504 of the house in the object (book) 500. The camera 200 then transmits the photographed image data to the server 300 along with a positional information acquisition request signal. The positional information acquisition request signal is a signal for causing the server 300 to search among the image data pieces registered in the image DB 305 for the image data similar to the image data transmitted along with the signal.

Upon receiving the positional information acquisition request signal and the image data transmitted therewith from the camera 200, the server 300 performs the similar image search to search for the similar image in the image data pieces stored in the image DB 305. According to the present exemplary embodiment, the server 300 searches for the image data similar to the received object (house) 400 included in the object (book) 500 and acquires the image data of the object (house) 400 as the search result. The server 300 then transmits to the camera 200 the positional information associated with the image data of the object (house) 400.

As described above, the camera 200 photographs the photograph 504 of the object (house) 400 included in the object (book) 500, so that the positional information of the object (house) 400 can be acquired from the server 300.

According to the above-described process, the camera 200 receives the actual position of the object (house) 400 from the server 300.

The above-described operations will be described in detail below by dividing into two operations, i.e., (1) an operation in which the camera 100 transmits the image data to the server 300, and the server 300 registers the image data in the image DB 305, and (2) an operation in which the server 300 transmits the positional information to the camera 200 based on the image photographed by the camera 200.

(1) OPERATION IN WHICH THE CAMERA 100 TRANSMITS THE IMAGE DATA TO THE SERVER 300, AND THE SERVER 300 REGISTERS THE IMAGE DATA IN THE IMAGE DB 305

The operation performed by the camera 100 configured as described above will be described below. FIGS. 4A and 4B illustrate the camera operation flows. Each of the processes illustrated in the flowcharts is realized by the system control unit 112 reading from the memory unit 110, developing, and executing the programs for controlling the operation performed by the camera 100. Each of the processes in each flowchart illustrating the operation performed by the camera 100 to be described below is realized by a similar method.

The process of the flowchart illustrated in FIG. 4A is started in response to the camera 100 receiving a photographing instruction via the operation unit 114.

In step S401, the system control unit 112 photographs the object and acquires the image data. The focusing unit 117 outputs the object distance information to the system control unit 112.

In step S402, the system control unit 112 uses the GPS 115 to obtain the positional information indicating the position of the camera 100. The process in step S402 may be executed in parallel with the process in step S401.

In step S403, the system control unit 112 acquires luminance signals of the image data from the camera signal processing unit 105. More specifically, the camera signal processing unit 105 divides the luminance signals of the image data into mesh frames of 4×4=16 as illustrated in FIG. 7A. The camera signal processing unit 105 averages the luminance values for each of the 16 mesh frames and generates sixteen luminance evaluation values. The generated luminance evaluation values are output to the system control unit 112.

In step S404, the system control unit 112 calculates the reliability based on the luminance signal and the object distance information. The process will be described below.

In step S405, the system control unit 112 adds the object distance information, the positional information, the luminance evaluation values, and the reliability to the image data using the recording control unit 107. The added information is used as the metadata of the image data acquired in step S401. The object distance information, the positional information, the luminance evaluation values, and the reliability are acquired in steps S401, S402, S403, and S404 respectively.

In step S406, the system control unit 112 causes the recording control unit 107 to record the image data to which the reliability is added in step S405 in the recording media 108.

The image data recorded in the recording media 108 as described above is transmitted along with the image storing request signal to the server 300 automatically or by the user operation received via the operation unit 114. The flow illustrated in FIG. 4B is started when the system control unit 112 receives an instruction to transmit the image data along with the image storing request signal.

Upon receiving the instruction to transmit the image data along with the image storing request signal, in step S407, the system control unit 112 transmits to the server 300 via the communication unit 116, the image data as a transmission target stored in the recording media 108 along with the image storing request signal.

The process for calculating the reliability performed in step S404 illustrated in FIG. 4A will be described below.

The system control unit 112 determines whether the actual object is being photographed or an output product such as a book or a television is being photographed, and then calculates the reliability. According to the present exemplary embodiment, the system control unit 112 calculates the reliability based on the luminance signal output from the camera signal processing unit 105 and the distance information output from the focusing unit 117. The method for calculating the reliability will be described in detail below.

FIG. 6 is a flowchart illustrating the operation performed by the camera 100 in the reliability calculation process performed in step S404 illustrated in FIG. 4A.

In step S600, the system control unit 112 calculates a dispersion value of the sixteen luminance evaluation values acquired from the camera signal processing unit 105. The dispersion value may be calculated using a general method.

In step S601, the system control unit 112 calculates the average value and the dispersion value of the nine object distance information pieces acquired from the focusing unit 117.

In step S602, the system control unit 112 determines whether the average value of the object distance calculated in step S601 is greater than or equal to a threshold value A. If the system control unit 112 determines that the average value of the object distance is greater than or equal to the threshold value A, i.e., the distance to the object is long, so that it is not likely that the camera 100 is photographing a book (YES in step S602), the process proceeds to step S603.

On the other hand, if the system control unit 112 determines that the average value of the object distance is smaller than the threshold value A, i.e., the distance to the object is short, so that it is likely that the camera 100 is photographing a book (NO in step S602), the process proceeds to step S604.

In step S603, the system control unit 112 increases the reliability to be added to the image data. More specifically, the system control unit 112 sets the reliability to a value (according to the present exemplary embodiment, the maximum value of the reliability is 1.0) acquired by adding a predetermined value (e.g., +0.5) to the reliability to be added to the image data (according to the present exemplary embodiment, an initial value of the reliability is 0.5).

In step 604, the system control unit 112 determines whether the dispersion value of the object distance is greater than or equal to a predetermined threshold value B. If the dispersion value of the object distance is greater than or equal to the threshold value B, the system control unit 112 determines that the object is likely to be the actual object. If the dispersion value of the object distance is greater than or equal to the threshold value B, it indicates that the object distance is dispersed, so that it is likely that the object is not flat. If the system control unit 112 determines that the dispersion value of the object distance is greater than or equal to the threshold value B (YES in step S604), the process proceeds to step S603.

On the other hand, if the system control unit 112 determines that the dispersion value of the object distance is less than the threshold value B, it indicates that the system control unit 112 has determined that the object is likely to be a book. If the dispersion value of the object distance is less than the threshold value B, the object distance is uniform, so that it is likely that the object is flat. If the system control unit 112 determines that the dispersion value of the object distance is less than the threshold value B (NO in step S604), the process proceeds to step S605.

In step S605, the system control unit 112 determines whether the dispersion value of the luminance evaluation values is greater than or equal to a threshold value C. If the dispersion value of the luminance evaluation values is greater than or equal to a threshold value C, the system control unit 112 determines that it is likely for the object to be a printed product such as a book. Since the dispersion value of the luminance values is high, and the dispersion value of the object distance is low (as a result of step S604), it indicates that the object is flat and the luminance dispersed like the printed product. In such a case (YES in step S605), the process proceeds to step S606. On the other hand, if the system control unit 112 determines that dispersion value of the luminance evaluation values is less than the threshold value C (NO in step S605), the process proceeds to step S607.

In step S606, the system control unit 112 decreases the reliability to be added to the image data. More specifically, the system control unit 112 sets to the reliability, a value in which a predetermined value (e.g., −0.5) is added to the reliability (according to the present exemplary embodiment, the minimum value of the reliability is 0.0). In step S607, the system control unit 112 sets the reliability to be added to the image data based on the dispersion value of the object distance.

More specifically, the system control unit 112 sets the reliability to become closer to the maximum value (1.0) as the dispersion value of the object distance becomes closer to the threshold value B. Further, the system control unit 112 sets the reliability to become closer the minimum value (0.0) as the dispersion value of the object distance becomes closer to 0. For example, the value to be added to the reliability becomes closer to +0.5 as the dispersion value of the object distance becomes closer to the threshold value B. Further, the value to be added to the reliability becomes closer to −0.5 as the dispersion value of the object distance becomes closer to 0. A value to be added to the reliability in the processing in step S607 is lower than the value added to the reliability in step S603 and higher than the value added to the reliability in step S606.

According to the above-described process, the system control unit 112 calculates the reliability. The calculated reliability is added as the metadata of the image data in step S405 illustrated in FIG. 4A. FIG. 8 illustrates an example of the metadata to be added to the image data. Referring to FIG. 8, positional information 801 and reliability 802 are added to the image data. The image data in FIG. 8 further includes data such as photographing date and time indicating the date and time the image data is photographed, and a manufacturer name and a product model indicating the camera used for photographing.

The operation performed by the camera 100 according to the present exemplary embodiment is as described above.

Figure 9:
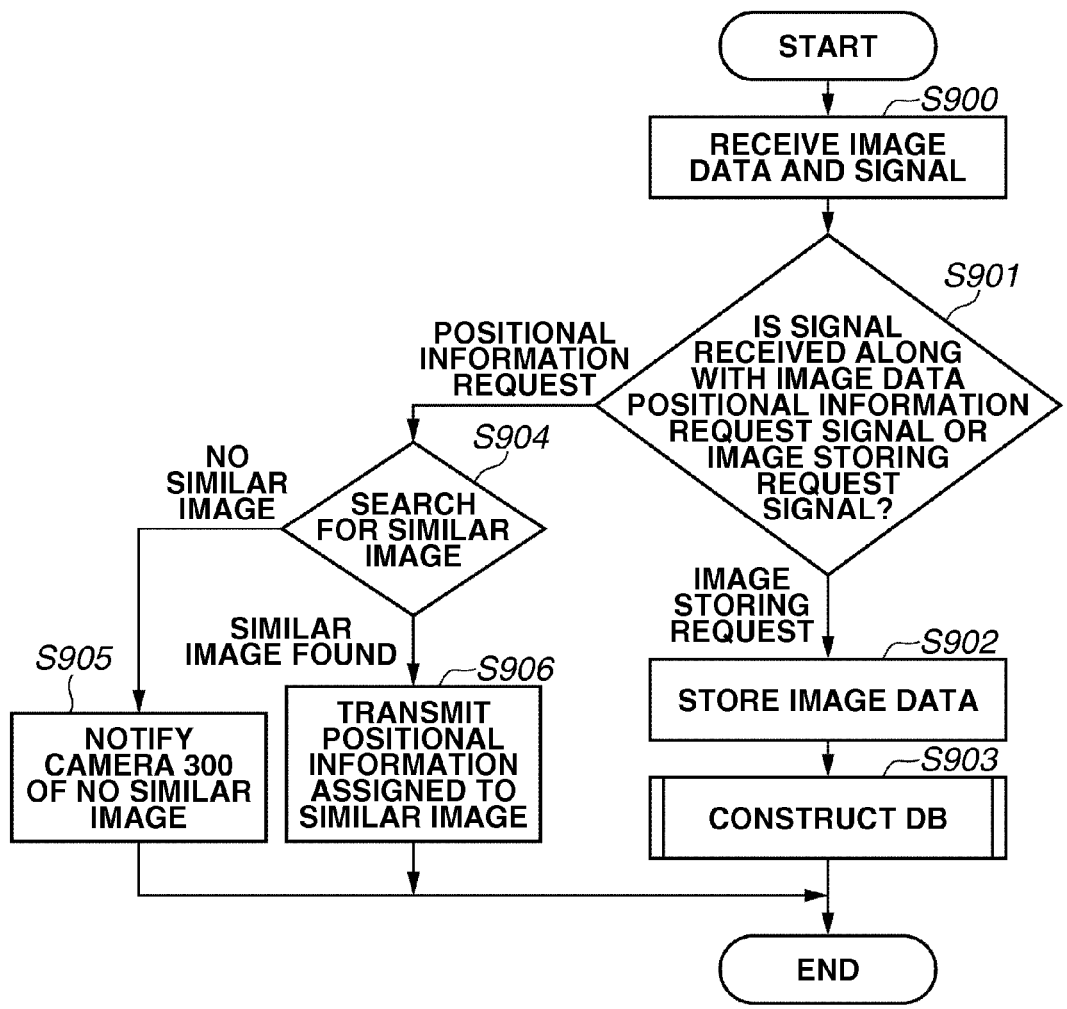
FIG. 9 is a flowchart illustrating an operation performed by the server according to the first exemplary embodiment of the present invention.

The operation performed by the server 300 that receives the image data from the camera 100 will be described below. FIG. 9 is a flowchart illustrating the operation performed by the server. Each of the processes illustrated in the flowchart is realized by the system control unit 302 reading from the memory unit 303, developing, and executing the program for controlling the operation performed by the server 300. Each of the processes in each flowchart illustrating the operation performed by the server 300 to be described below is realized by a similar method.

In step S900, the server 300 receives from the camera 100 via the communication unit 301, the image storing request signal or the positional information request signal along with the image data.

In step S901, the system control unit 302 determines whether the signal received by the server 300 along with the image data is the image storing request signal or the positional information request signal.

Here, the case in which the system control unit 302 determines in step S901 that the signal received by the server 300 in step S900 is the image storing request signal will be described. The case in which the system control unit 302 determines in step S901 that the signal received by the server 300 in step S900 is the positional information request signal will be described below.

If the system control unit 302 determined that the signal received in step S900 is the image storing request signal (IMAGE STORING REQUEST in step S901), the process proceeds to step S902.

In step S902, the system control unit 302 stores in the image recording unit 304, the image data received along with the image storing request signal.

In step S903, the system control unit 302 constructs the image DB 305 using the image data stored in step S902. More specifically, the system control unit 302 registers in the image DB 305, the image data whose reliability is greater than or equal to a predetermined value among the image data pieces stored in the image recording unit 304.

The operation performed by the server in constructing the image DB 305 in step S903 will be described below.

Figure 11:
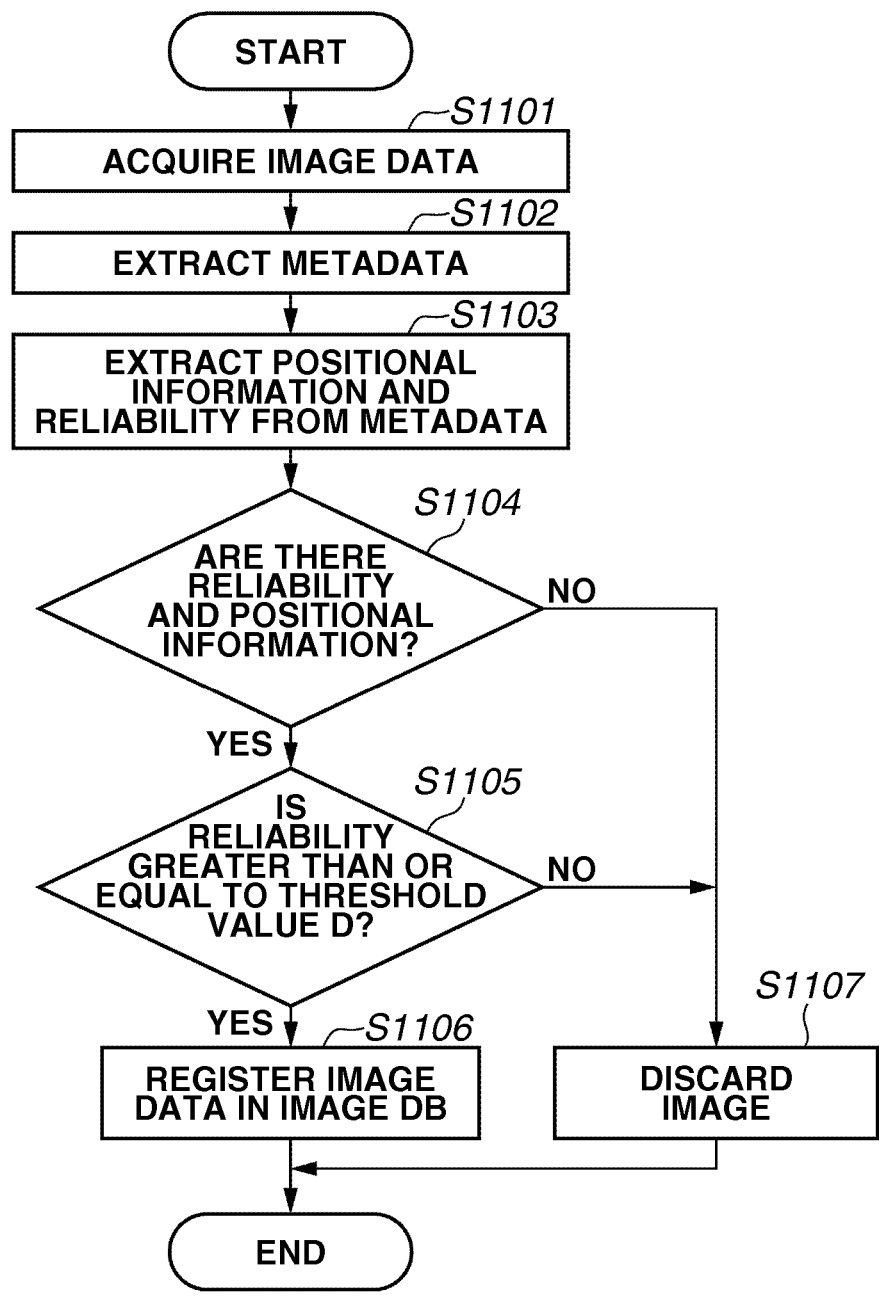
FIG. 11 is a flowchart illustrating an image database construction process according to the first exemplary embodiment of the present invention.

FIG. 11 is a flowchart illustrating the operation performed by the server 300 when constructing the image DB 305.

In step S1101, the system control unit 302 acquires the image data recorded in the image recording unit 304. According to the present exemplary embodiment, the system control unit 302 acquires the image data by generating a copy of the image data in the memory unit 303.

In step S1102, the system control unit 302 extracts the metadata as illustrated in FIG. 8 from the acquired image data.

In step S1103, the system control unit 302 acquires the positional information and the reliability from the extracted metadata.

In step S1104, the system control unit 302 determines whether the positional information and the reliability can be acquired from the metadata, to determine whether the positional information and the reliability have been recorded in the image data. If the system control unit 302 determines that the positional information and the reliability have been recorded (YES in step S1104), the process proceeds to step S1105. If the system control unit 302 determines that the positional information and the reliability have not been recorded (NO in step S1104), the process proceeds to step S1107.

In step S1105, the system control unit 302 determines whether the reliability is greater than or equal to a threshold value D. If the system control unit 302 determines that the reliability is greater than or equal to the threshold value D (YES in step S1105), the process proceeds to step S1106. On the other hand, if the system control unit 302 determines that the reliability is less than the threshold value D (NO in step S1105), the process proceeds to step S1107.

In step S1106, the system control unit registers the image data in the image DB 305. According to the present exemplary embodiment, the system control unit 302 registers the image data in the image DB 305 by storing the copy of the image data generated in the memory unit 303 in the HDD, which configures the image DB 305.

In step S1107, the system control unit 302 ends the process without registering the image data in the image DB 305. In such a case, the copy of the image data generated in the memory unit 303 is discarded.

According to the above-described process, the system control unit 302 constructs the image DB 305. By performing such control, only the image data whose positional information is recorded and whose reliability is high is registered in the image DB 305.

(2) OPERATION IN WHICH THE IMAGE DATA PHOTOGRAPHED BY THE CAMERA 200 IS TRANSMITTED TO THE SERVER 300, AND THE SERVER 300 TRANSMITS THE POSITIONAL INFORMATION INDICATING THE PHOTOGRAPHING POSITION OF THE IMAGE DATA TO THE CAMERA 200 IN RESPONSE TO RECEPTION OF THE IMAGE DATA

The process performed when the image data photographed by the camera 200 is transmitted to the server 300 along with the positional information request signal, and the server 300 in response performs the similar image search and transmits to the camera 200 the positional information added to the similar image data will be described below.

Figure 10:
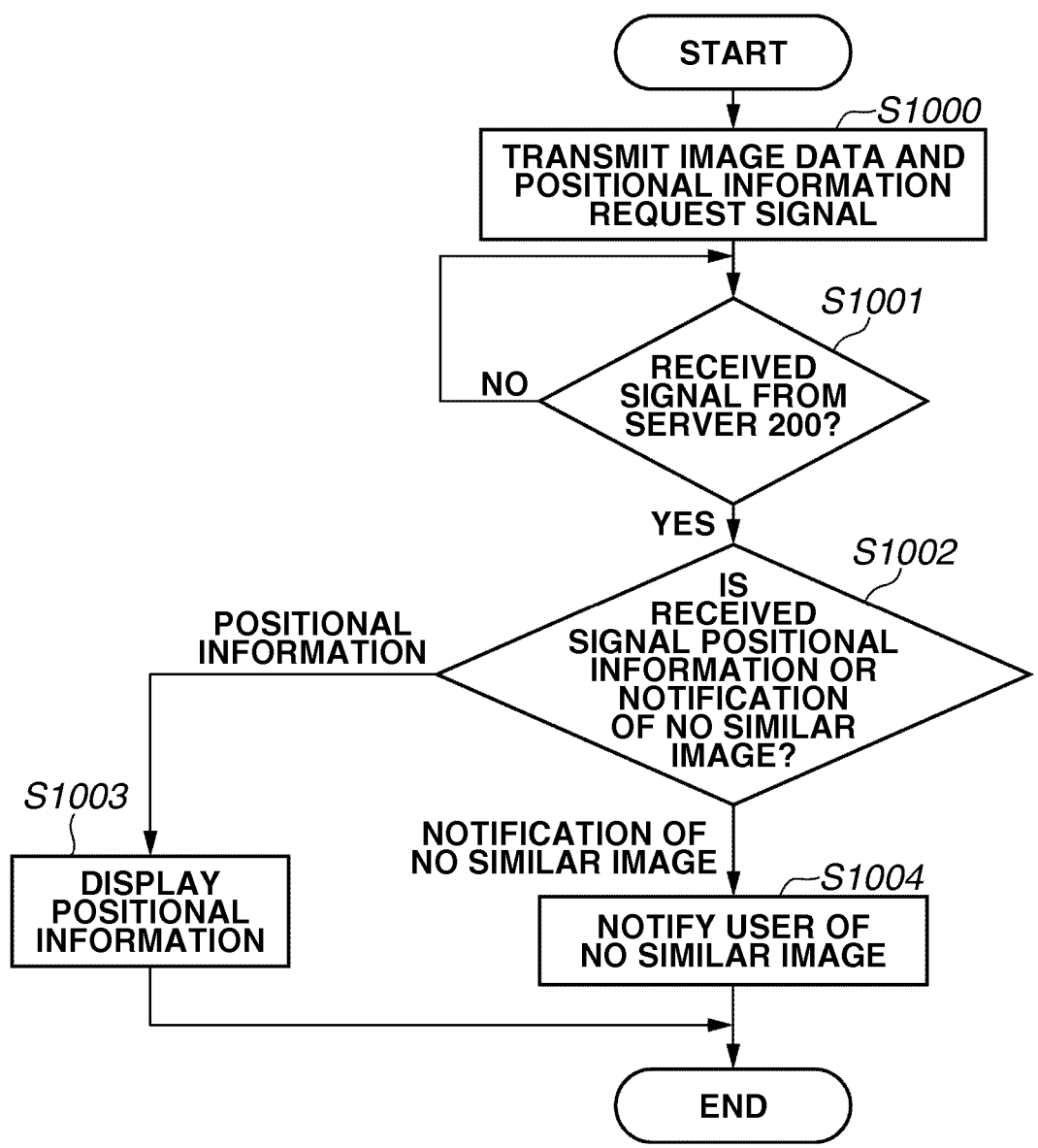
FIG. 10 is a flowchart illustrating an operation performed by the camera according to the first exemplary embodiment of the present invention.

FIG. 10 is a flowchart illustrating the operation in which the camera 200 transmits the positional information request signal along with the image data to the server 300 and receives the positional information from the server 300. The flow automatically starts, or is started by receiving a user instruction via the operation unit 114 to transmit the image data along with the image storing request signal to the server 300.

In step S1000, the system control unit 112 transmits to the server 300 via the communication unit 116, the positional information request signal along with the image data.

The operation performed by the server 300 will be described below with reference to FIG. 9.

Here, the case in which the server 300 has received the positional information request signal transmitted thereto in step S1000 illustrated in FIG. 10 will be described below. In other words, the case where it is determined in step S901 in FIG. 9 that the signal received by the server 300 is the positional information request signal will be described below. In such a case (POSITIONAL INFORMATION REQUEST in step S901), the process proceeds to step S904.

In step S904, the system control unit 302 searches in the image data pieces registered in the image DB 305 for an image whose feature is similar to the object in the image data received along with the positional information request signal.

If the system control unit 302 determines that there is no similar image data (NO SIMILAR IMAGE in step S904), the process proceeds to step S905. In step S905, the system control unit 302 notifies the camera 200 of no similar image data, and then ends the process.

On the other hand, if the system control unit 302 determines that there is the similar image data (SIMILAR IMAGE FOUND in step S904), the process proceeds to step S906. In step S906, the system control unit 302 transmits to the camera 200 via the communication unit 301, the positional information added to the image data which is most similar. The process then ends.

Returning to the operation performed by the camera 200 illustrated in the flowchart of FIG. 10, after transmitting to the server 300 the image data along with the positional information request signal in step S1000, in step S1001, the system control unit 112 determines whether a signal is received from the server 300. If the system control unit 112 determines that the signal has not been received from the server 300 (NO in step S1001), the system control unit 112 repeats the process of step S1001. The process in the flowchart may be controlled to end after repeating the process in step S1001 at a predetermined number of times or after a predetermined time has elapsed.

If the system control unit 112 determines that the signal has been received from the server 300 (YES in step S1001), the process proceeds to step S1002. In step S1002, the system control unit 112 determines whether the received signal is the notification of no similar image data transmitted from the server 300 in step S905 in FIG. 9, or the positional information transmitted from the server 300 in step S906 in FIG. 9.

If the system control unit 112 determines that the received signal is the notification of no similar image data (NOTIFICATION OF NO SIMILAR IMAGE in step S1002), the process proceeds to step S1004. In step S1004, the system control unit 112 notifies the user that there is no similar image data in the image DB 305 in the server 300 based on the received notification. For example, the system control unit 112 notifies the user by displaying on the display unit 113 a message such as "no similar image". The notification method is not limited to the above example.

On the other hand, if the system control unit 112 determines that the received signal is the positional information (POSITIONAL INFORMATION in step S1002), the process proceeds to step S1003. In step S1003, the system control unit 112 displays the received positional information on the display unit 113. For example, the system control unit 112 causes the display unit 113 to display a message such as "the positional information of the image is XXXX" along with the image data that the camera 200 transmitted to the server 300.

The notification method is not limited to the above example. Further, the positional information acquired from the server 300 may be added as the metadata of the image data.

The above-described operation is performed by the camera 200 and the server 300, when the image data photographed by the camera 200 is transmitted to the server 300 along with the positional information request signal, and the server 300 performs the similar image search in response and transmits to the camera 200 the positional information added to the similar image data.

As described above, the camera 100 in the system according to the present exemplary embodiment generates the reliability indicating the level of association between the positional information indicating the position of the camera 100 when photographing and the content of the photographed image data. The camera 100 records the reliability as the metadata. Further, the server 300 constructs the image database using the image data whose reliability is higher than the predetermined value. Accordingly, the positional information of high accuracy can be provided when the camera 200 searches for the positional information using the similar image data.

The system according to the present exemplary embodiment may be configured to determine whether to transmit the image data using the reliability associated with the image data, when the camera 100 transmits to the server 300 the image data along with the image storing request signal.

For example, the system control unit 112 may perform control so that if the reliability associated with the image data is high, the image data is transmitted to the server 300, and if the reliability is low, the image data is not transmitted. According to such control, only the image data whose reliability is high is registered in the image DB 305. Highly accurate positional information can thus be acquired when searching for the positional information using the similar image data.

Further, the server 300 maybe configured to determine, when searching for the similar image, whether to set the image data as the search target based on the reliability, instead of constructing the image database. For example, control may be performed so that if the reliability associated with the image data is higher than a predetermined value, the image data becomes a search target, and if the reliability associated with the image data is less than or equal to the predetermined value, or the reliability is not associated with the image data, the image data does not become a search target. Accordingly, the server 300 can provide to the camera 200 highly accurate positional information without constructing the image database.

The first exemplary embodiment is as described above.

According to the first exemplary embodiment, the reliability of the positional information is added in the camera 100 as the metadata of the image data.

According to a second exemplary embodiment, the reliability of the positional information is added as the metadata of the image data when the image data is transmitted from the camera 100 to the server 300.

Since the configurations of the camera 100, the server 300, and the camera 200 according to the present exemplary embodiment are similar to those of the first exemplary embodiment, description will be omitted.

The present exemplary embodiment is different from the first exemplary embodiment in that the reliability is not calculated and associated with the image data when the image data is stored after photographing. The reliability is instead calculated when the image data stored in the recording media 108 is transmitted to outside the camera, and is then associated with the image data.

The basic operation performed by the system according to the present exemplary embodiment will be described below.

Referring to FIGS. 1, 2A, and 2B, after the camera 100 photographs the object (house) 400, the recording control unit 107 stores the photographed image data in the recording media 108 by adding the positional information, the object distance information, and the luminance evaluation values.

If the system control unit 112 receives an instruction to transmit the stored image data to the server 300, the system control unit 112 acquires the object distance information and the luminance evaluation values from the metadata of the image data and calculates the reliability before transmitting the image data to the server 300.

The system control unit 112 adds the calculated reliability to the image data to be transmitted as the metadata, and then transmits the image data to the server 300 via the communication unit 116.

The subsequent operation performed by the server 300, and the operation performed by the server 300 when transmitting the positional information to the camera 200 based on the image data photographed by the camera 200 are similar to those according to the first exemplary embodiment. Description will thus be omitted.

Figure 12A:
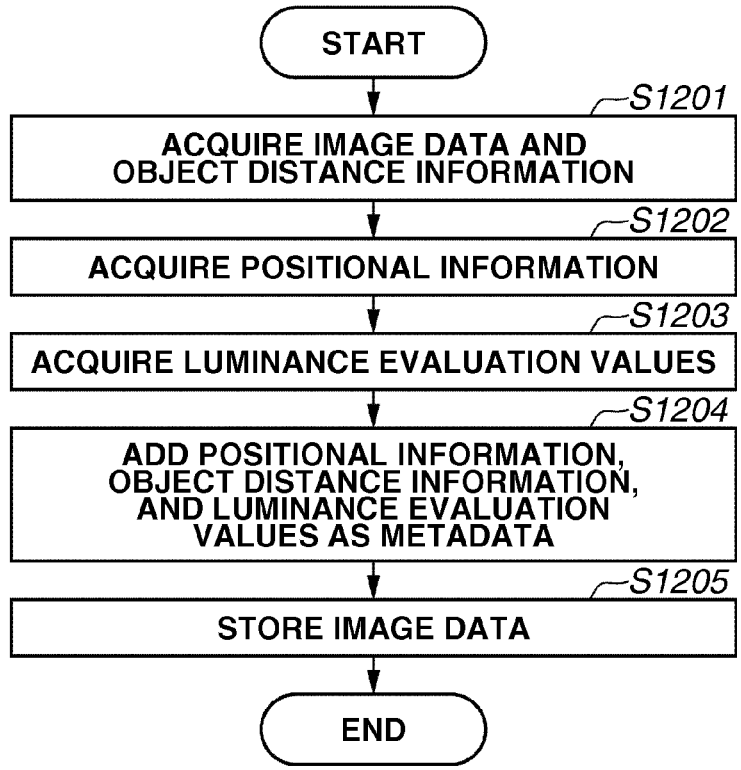
FIGS. 12A and 12B are flowcharts illustrating operations performed by a camera according to a second exemplary embodiment of the present invention.
Figure 12B:
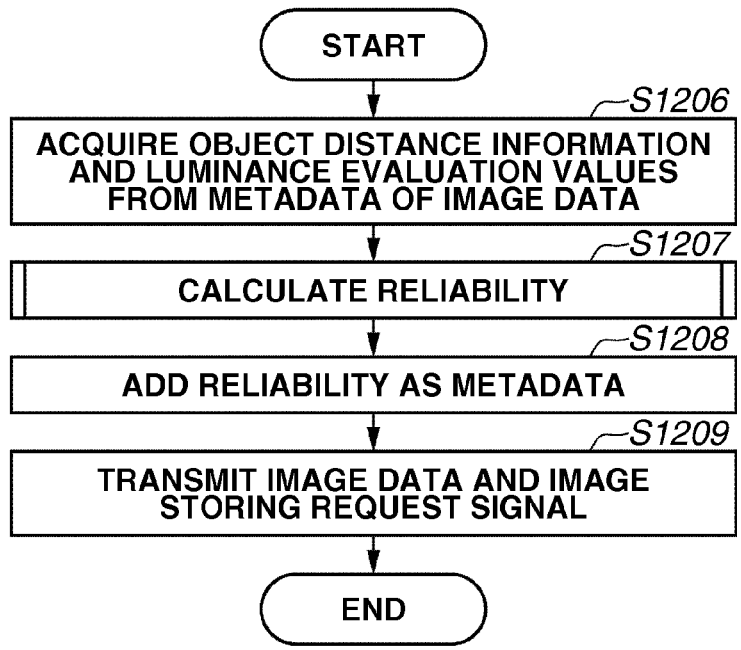

FIGS. 12A and 12B illustrate the operations of the camera 100 performing the process according to the present exemplary embodiment. FIG. 12A is a flowchart illustrating the operation for storing the photographed image data. FIG. 12B is a flowchart illustrating the operation for transmitting the stored image data to the server 300 after associating the reliability with the image data.

The process illustrated in the flowchart in FIG. 12A is started according to the camera 100 receiving the photographing instruction via the operation unit 114.

The processes performed in step S1201 to step S1203 are similar to those in step S401 to step S403 illustrated in FIG. 4, so that description will be omitted.

In step S1204, the system control unit 112 adds to the image data acquired in step S1201, the acquired positional information, the object distance information, and the luminance evaluation values as the metadata.

In step S1205, the system control unit 112 stores the image data in the recording media 108.

The stored image data is then transmitted to the server 300 along with the image storing request signal at predetermined timing or according to the user operation received via the operation unit 114.

The process illustrated in the flowchart in FIG. 12B is started according to the camera 100 receiving an instruction to transmit the image data along with the image storing request signal. The processes of step S1206 to step S1208 in the flowchart illustrated in FIG. 12B are performed before the image data is transmitted to the server in step S1209.

In step S1206, the system control unit 112 acquires via the recording control unit 107, the object distance information and the luminance evaluation values added to the image data to be transmitted.

In step S1207, the system control unit 112 calculates the reliability using the object distance information and the luminance evaluation values acquired in step S1206. The process in step S1207 is similar to the process performed in step S404 illustrated in FIG. 4.

In step S1208, the system control unit 112 causes the recording control unit 107 to add the reliability calculated in step S1207 to the image data to be transmitted as the metadata.

In step S1209, the system control unit 112 performs control to transmit the image data to which the reliability is added as the metadata along with the image storing request signal to the server 300 via the communication unit 116.

The operation for calculating the reliability according to the present exemplary embodiment is as described above.

According to the above-described operations, the reliability is not calculated and added when the photographed image data has not been transmitted to outside the camera. In other words, if it is likely that only the photographer of the image data is the user of the positional information added to the image data, the reliability is not calculated and added to the image data. Thus, a load on the camera 100 can be reduced. Further, the reliability of the image data is added when the image data is to be transmitted to outside the camera. In other words, the reliability can be added before the positional information of the image data is disclosed.

According to the second exemplary embodiment, when the camera 100 transmits the image data, the reliability is added to the image data. In contrast, according to a third exemplary embodiment, the reliability of the positional information is added as the metadata to the image data in the server 300.

The configurations of the camera 100, the server 300, and the camera 200 according to the present exemplary embodiment are similar to those of the first exemplary embodiment. The present exemplary embodiment is different from the first exemplary embodiment in that the system control unit 112 in the camera 100 does not calculate the reliability, and the system control unit 302 in the server 300 calculates the reliability.

The basic operation performed by the system according to the present exemplary embodiment will be described below.

Referring to FIGS. 1, 2A, and 2B, after the camera 100 photographs the object (house) 400, the recording control unit 107 stores the photographed image data in the recording media 108 by adding the positional information, the object distance information, and the luminance evaluation values as the metadata of the photographed image data.

If the system control unit 112 receives an instruction to transmit the stored image data to the server 300, the system control unit 112 transmits the image data to the server 300 via the communication unit 116.

The server 300 then receives the image data transmitted from the camera 100 and stores the image data in the image recording unit 304. At the same time, the system control unit 302 acquires the object distance information and the luminance evaluation values from the metadata of the received image data, and calculates the reliability. The received image data to which the calculated reliability is added as the metadata is thus stored in the image recording unit 304. The server 300 then records the image data whose reliability is higher than the predetermined value in the image DB 305 among the image data pieces stored in the image recording unit 304, similarly as in the first exemplary embodiment.

The subsequent operations performed by the server 300 when transmitting the positional information based on the image data photographed by the camera 200 are similar to those according to the first exemplary embodiment. Description will thus be omitted.

The operation performed by the camera 100 according to the present exemplary embodiment is similar to that illustrated in FIGS. 12A and 4B.

The image data stored in the recording media 108 by performing the operation illustrated in FIG. 12A is transmitted to the server 300 along with the image storing request signal, automatically or according to the user operation received via the operation unit 114.

The operation performed by the server 300 that has received the image data transmitted along with the image storing request signal will be described below.

Figure 13:
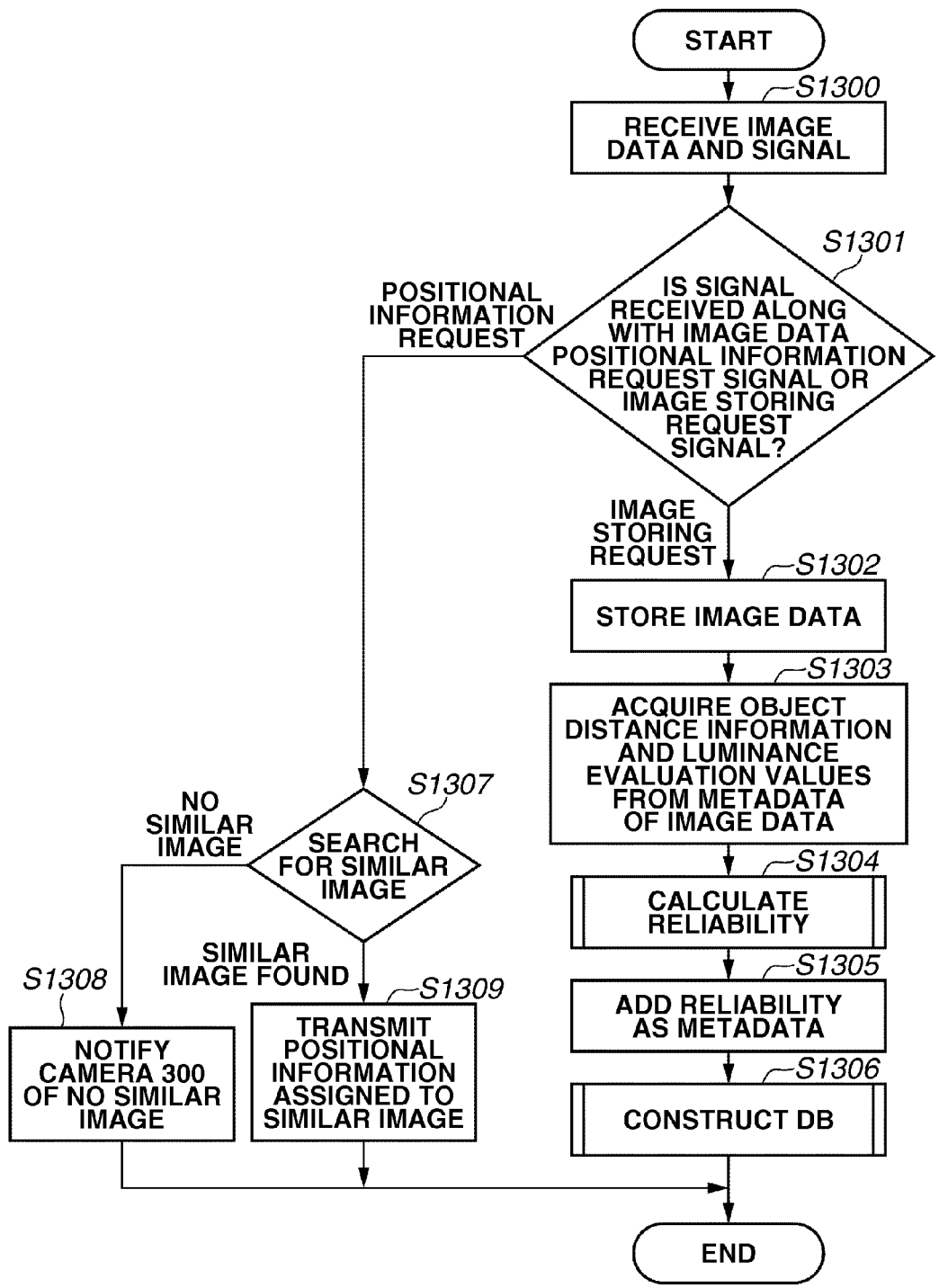
FIG. 13 is a flowchart illustrating an operation performed by a server according to a third exemplary embodiment of the present invention.

FIG. 13 is a flowchart illustrating the operation performed by the server 300 according to the present exemplary embodiment. In the flowchart illustrated in FIG. 13, the process performed in step S1302 is similar to that in step S902 in FIG. 9, the process performed in step S1306 is similar to that S903 in FIG. 9, and the processes of step S1303 to step S1305 are performed therebetween. The processes performed in the steps other than the above-described steps are similar to those performed in the flowchart illustrated in FIG. 9.

In step S1300, the server 300 receives from the camera 100 via the communication unit 301, the image storing request signal or the positional information request signal along with the image data.

In step S1301, the system control unit 302 determines whether the signal received along with the image data is the image storing request signal or the positional information request signal.

When the system control unit 302 determines that the signal received along with the image data is the image storing request signal (IMAGE STORING REQUEST in step S1301), the process proceeds to step S1302. Since the case where the process proceeds to step S1307 is similar to that in the first exemplary embodiment, description will be omitted.

In step S1302, the system control unit 302 performs control to store in the image recording unit 304, the image data received along with the image storing request signal.

In step S1303, the system control unit 302 acquires the object distance information and the luminance evaluation values from the metadata of the image data stored in the image recording unit 304.

In step S1304, the reliability is calculated by the processes similarly to those illustrated in step S404 of FIG. 4A and FIG. 6.

In step S1305, the system control unit 112 adds the reliability acquired in step S1304 as metadata to the image data received in step S1300, and stores the image data in the image recording unit 304.

Since the processes in step S1306 and thereon are similar to those illustrated in FIG. 9, description will be omitted.

As described above, the server 300 according to the present exemplary embodiment capable of adding the reliability to the image data, so that even if the camera 100 does not include a function for calculating the reliability, the reliability can be added to the image data.

According to the third exemplary embodiment, the server generates the reliability.

According to the above-described exemplary embodiments, the reliability is calculated based on the object distance information and the luminance evaluation values. In contrast, according to a fourth exemplary embodiment, the reliability is calculated by six methods to be described below, in addition to the above-described method:

(1) A method for calculating the reliability using the object distance information;

(2) A method for calculating the reliability using the luminance evaluation values;

(3) A method for calculating the reliability using the positional information distribution;

(4) A method for calculating the reliability using the contrast information;

(5) A method for calculating the reliability using the flicker detection and scanning lines detection; and (6) A method for calculating the reliability using the state of the focus lens.

The above-described reliability calculation processes are used instead of, or in combination with the reliability calculation process described with reference to FIG. 6.

(1) A METHOD FOR CALCULATING THE RELIABILITY USING THE OBJECT DISTANCE INFORMATION

The method for calculating the reliability using the object distance information among the object distance information and the luminance evaluation values will be described below. In such a method, the reliability is set high when the object distance is long, or when the dispersion value of the distance is large. If the object distance is short and the dispersion value of the distance is small, the reliability is set low.

Figure 14:
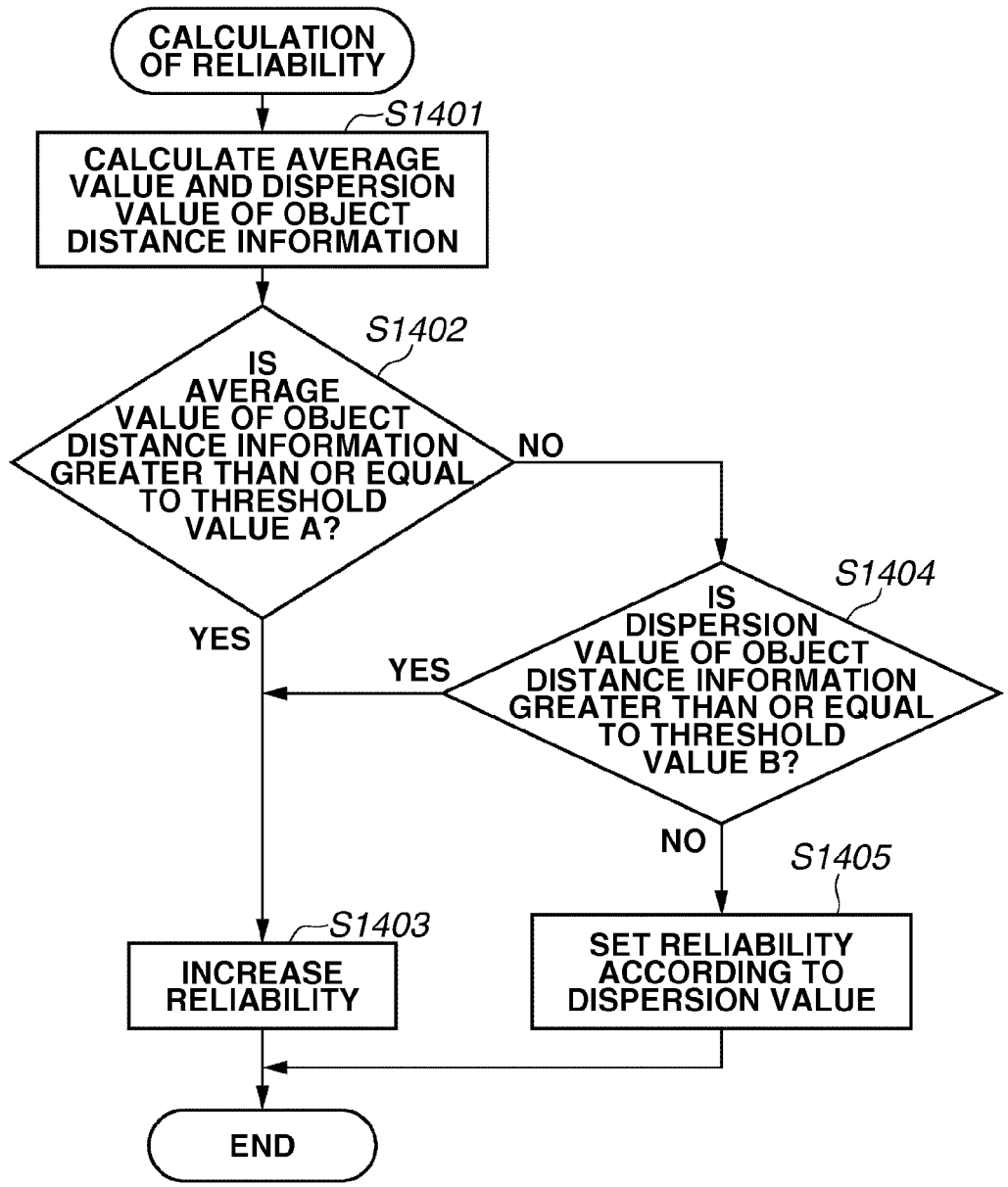
FIG. 14 is a flowchart illustrating a process for calculating the reliability using object distance information according to the third exemplary embodiment of the present invention.

FIG. 14 is a flowchart illustrating the process for calculating the reliability using the object distance information.

The flowchart illustrated in FIG. 14 is similar to the flowchart illustrated in FIG. 6. The difference is that step S600 in FIG. 6 is deleted, and the process in step S1405 is performed instead of step S605 to step S607. Since the processes performed in step S1401 to step S1404 are similar to these in step S601 to step S604, description thereof will be omitted.

In step S1404, if the dispersion value of the object distance is determined to be greater than or equal to the threshold value B (YES in step S1404), the process proceeds to step S1403. In step S1403, the system control unit 112 or the system control unit 302 increases the reliability. More specifically, the system control unit 112 or the system control unit 302 sets to the reliability (according to the present exemplary embodiment, an initial value of the reliability is 0.5), a value in which a predetermined value (i.e., +0.5) is added to the reliability.

On the other hand, if the dispersion value of the object distance is determined to be less the threshold value B (NO in step S1404), the process proceeds to step S1405. In step S1405, the system control unit 112 or the system control unit 302 sets the reliability according to the dispersion value of the object distance.

According to the present exemplary embodiment, the system control unit 112 or the system control unit 302 sets the reliability higher as the dispersion value becomes closer to the threshold value B, and sets the reliability lower as the dispersion value becomes closer to 0. In other words, the system control unit 112 or the system control unit 302 approximates the value to be added to the reliability to +0.5 as the dispersion value becomes closer to the threshold value B. Further, the system control unit 112 or the system control unit 302 approximates the value to be added to the reliability to −0.5 as the dispersion value becomes closer to 0. A value to be added to the reliability in the processing in step S1405 is lower than the value added to the reliability in step S1403.

According to the above-described method, the reliability is calculated using the object distance information. As a result, if the distance between the object and the camera 100 is short, and the dispersion value of the object distance is low (i.e., the object is flat), the reliability can be set low.

(2) A METHOD FOR CALCULATING THE RELIABILITY USING THE LUMINANCE EVALUATION VALUES

The method for calculating the reliability using the luminance evaluation values among the object distance information and the luminance evaluation values will be described below. Such a method uses the likeliness of a sharp change in the luminance to occur in the luminance distribution within the photographing range, i.e., the photographic information, at a boundary between a sheet of a book and an image area.

Figure 15A:
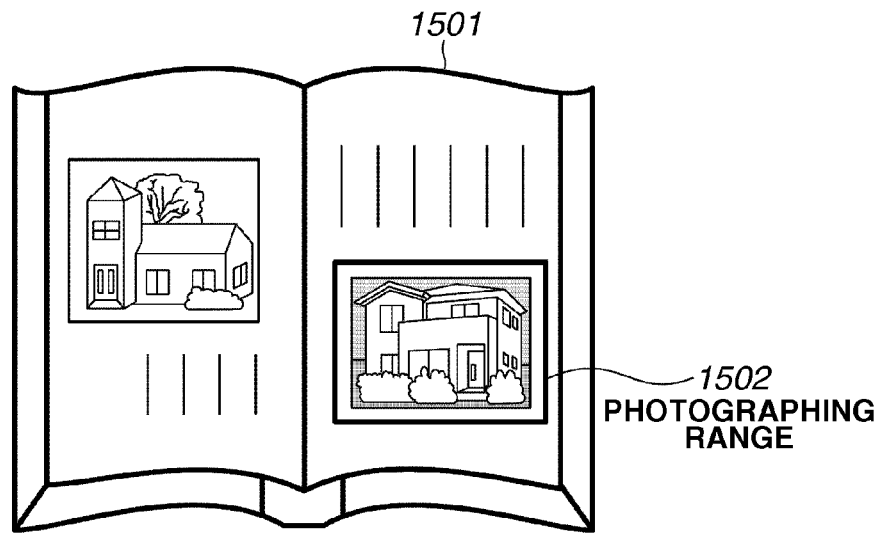
FIGS. 15A, 15B, and 15C illustrate a method for calculating the reliability using luminance evaluation values according to a fourth exemplary embodiment of the present invention.
Figure 15B:
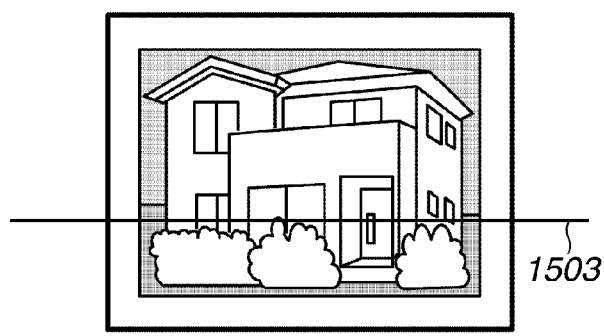
Figure 15C:
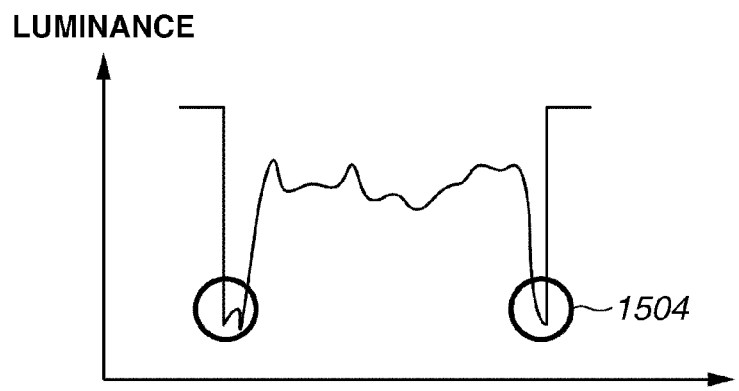

FIG. 15A illustrates a relationship between the book and the photographing range when the photograph included in the book is photographed. Referring to FIG. 15A, a photographing range 1502 includes a photograph appearing in a book 1501 and a background thereof. FIG. 15B illustrates the photographed image data. FIG. 15C illustrates a luminance waveform of a line 1503 of one-pixel width in the photographed image data (illustrated in FIG. 15B). Referring to FIG. 15C, a vertical axis indicates the luminance, and a horizontal axis indicates pixels.

When a book is photographed, there may be a sharp change in the luminance as illustrated by a waveform 1504 illustrated in FIG. 15C. Such a sharp change in the luminance occurs at a point corresponding to the boundary between the image area and the sheet in the book. It is expected that such a sharp change in the luminance is likely to occur in the image data acquired by photographing a printed product.

It is thus determined whether such a sharp change in the luminance is included in the luminance signal, and if the sharp change in the luminance is detected, it is determined that the object is likely to be a printed product. The reliability is then set low. More specifically, if a difference between the luminance of a pixel position and the luminance of an adjacent pixel position in a luminance waveform is greater than or equal to a predetermined value, it is determined that there is a sharp change in the luminance.

Figure 16:
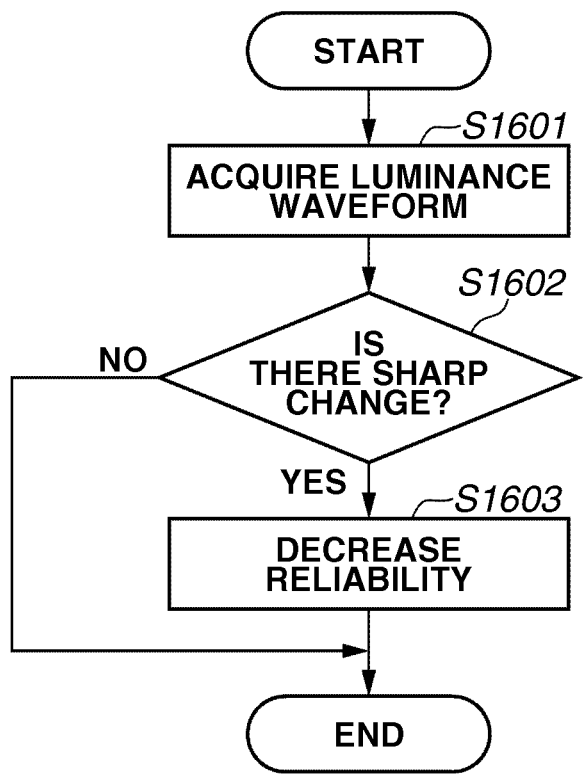
FIG. 16 is a flowchart illustrating a process for calculating the reliability using the luminance evaluation values according to the fourth exemplary embodiment of the present invention.

FIG. 16 is a flowchart illustrating the method for calculating the reliability using the luminance evaluation values. The process for calculating the reliability using the luminance evaluation values will be described below.

In step S1601, the system control unit 112 in the camera or the system control unit 302 in the server 300 acquires from the image data to which the reliability is added, the luminance waveform of the image data of an arbitrary line as illustrated in FIG. 15C.

In step S1602, the system control unit 112 or the system control unit 302 determines whether there is a sharp change in the luminance.

If it is determined that there is a sharp change in the luminance (YES in step S1602), the process proceeds to step S1603. In step S1603, the system control unit 112 or the system control unit 302 lowers the reliability. For example, the value of −0.5 is added to the reliability.

On the other hand, if it is determined that there is no sharp change in the luminance (NO in step S1602), the system control unit 112 or the system control unit 302 ends the process without changing the reliability.

According to the above-described method, the reliability is calculated using the luminance evaluation values. As a result, if there is a sharp change in the luminance value of the image data, the reliability can be set low.

(3) A METHOD FOR CALCULATING THE RELIABILITY USING THE POSITIONAL INFORMATION DISTRIBUTION

The method for calculating the reliability using the positional information distribution will be described below. The positional information distribution is the distribution of the positional information associated with the image data similar to (i.e., similar image data) the image data received from the camera 100 (i.e., received image data), among the image data pieces registered in the image DB 305 in the server 300.

Figure 17:
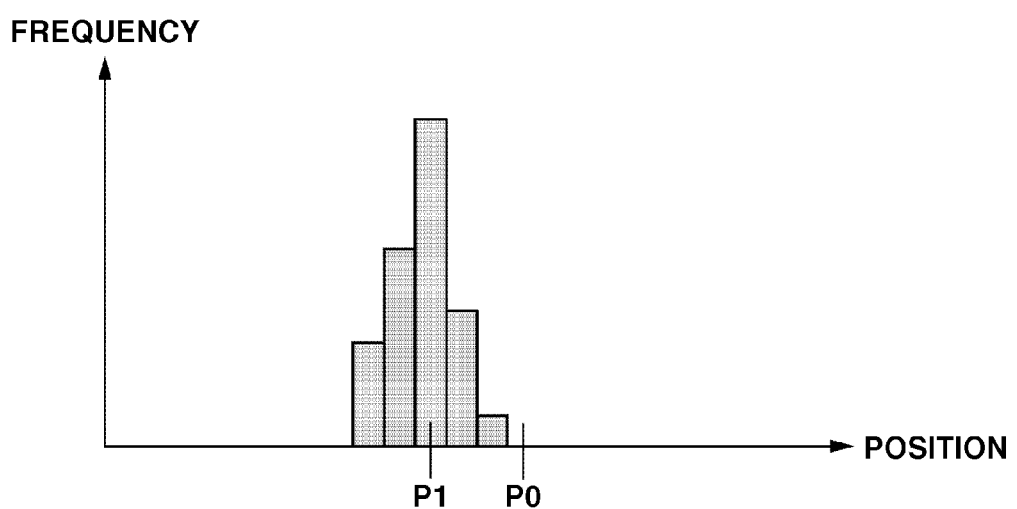
FIG. 17 illustrates an example of a distribution of the positional information added to each of a plurality of similar image data pieces searched from an image database according to the fourth exemplary embodiment of the present invention.

FIG. 17 illustrates an example of a histogram indicating the distribution of the positional information associated with each of a plurality of similar image data pieces. Referring to FIG. 17, the horizontal axis indicates the positional information associated with the similar image data, and the vertical axis indicates frequency expressing the number of the similar image data pieces.

According to the present exemplary embodiment, the positional information is added in terms of longitude and latitude, so that the horizontal axis of the histogram illustrated in FIG. 17 indicates classes of the longitude or the latitude. The classes may be determined according to an arbitrary method. Hereinafter, the classes will be referred to as positions. If the frequency is large at a position, it indicates that there is a large amount of similar image data pieces associated with the longitude or the latitude of that position.

When the camera 100 transmits to the server 300 the image data to which the positional information is added as the metadata, the system control unit 302 searches in the image data pieces registered in the image data DB 305 for the image data similar to the received image data. If there is the similar image data, the system control unit 302 calculates from the positional information associated with the searched similar image data, the histogram indicating the distribution of the positional information pieces associated with the similar image data pieces as illustrated in FIG. 17. Further, the system control unit 302 calculates from the histogram, the position indicating a peak of the histogram (i.e., a peak position).

The system control unit 302 then calculates the reliability using the peak position, the frequency at the peak position, and the position indicated by the positional information associated with the received data (i.e., an image data position). According to the present exemplary embodiment, the peak position is a position at which, when a difference between the frequency of a position and the frequency of a position to the immediate right of the position is obtained, the difference becomes a positive value from a negative value. The method for determining the peak position is not limited to the above example. The peak position in the example illustrated in FIG. 17 is a position P1.

If the frequency of the peak position P1 is greater than or equal to a predetermined value, and the peak position P1 is within a predetermined distance from an image data position P0, it is determined that a large number of image data pieces similar to the received image data has been photographed within a predetermined distance. In such a case, the reliability is set high.

On the other hand, if there is no peak position, or if the frequencies of all peak positions are less than a predetermined value, it is not possible to determine the reliability from the histogram. In such a case, the reliability is not changed.

Further, if the frequency of the peak position P1 is greater than or equal to a predetermined value, and the image data position P0 is outside a predetermined distance from the peak position P1, the reliability is set low. This is because if the image data position PO is outside the predetermined distance from the peak position P1, the positions at which a large number of image data pieces similar to the received image data has been photographed are far from the photographing position of the received image data. The reliability is thus set low.

Figure 18:
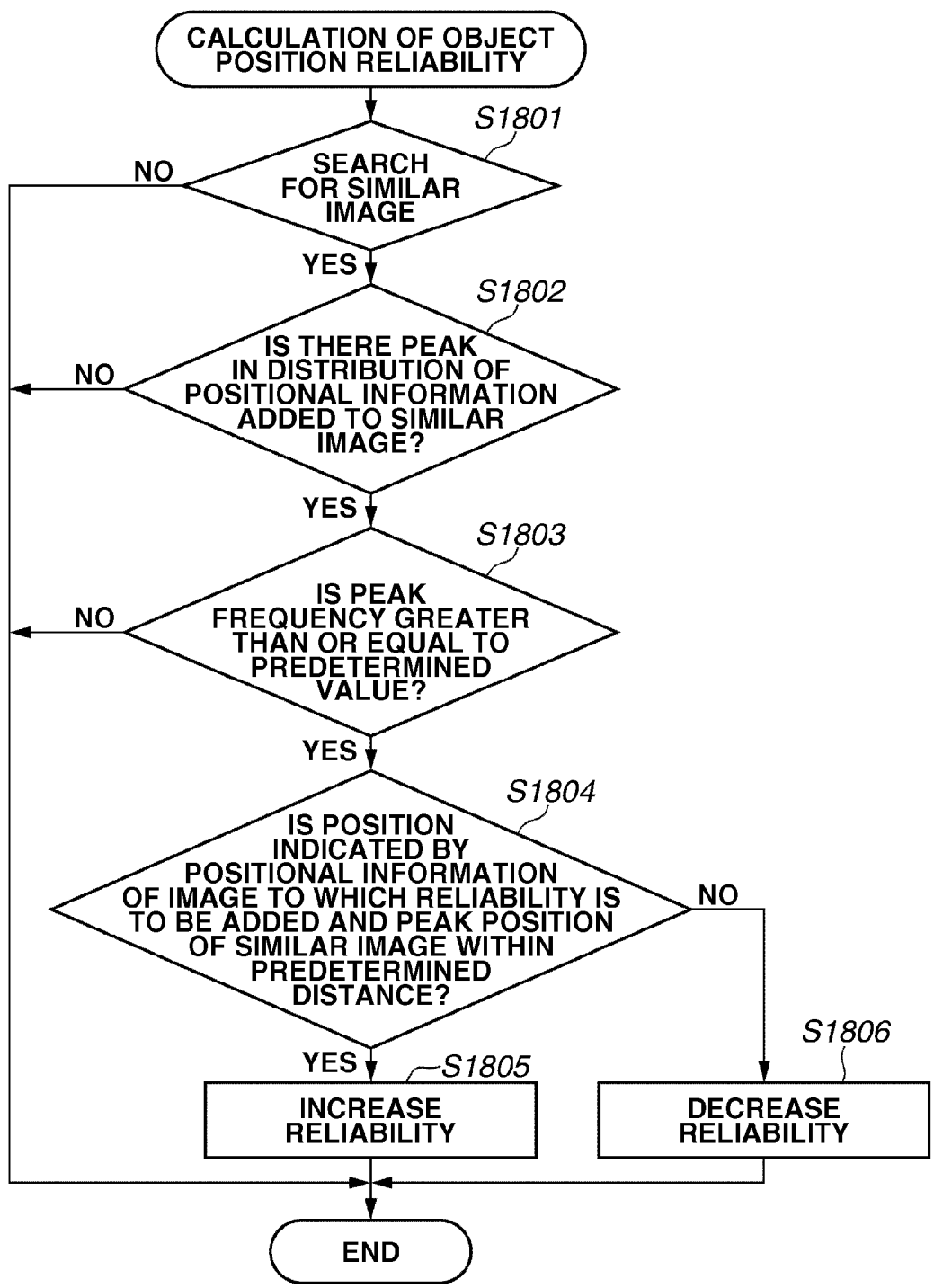
FIG. 18 is a flowchart illustrating a process for calculating the reliability using positional information distribution according to the fourth exemplary embodiment of the present invention.

FIG. 18 is a flowchart illustrating the method for calculating the reliability using the positional information distribution. The process for calculating the reliability using the positional information distribution will be described below with reference to the flowchart illustrated in FIG. 18.

In step S1801, the system control unit 302 searches in the image data pieces registered in the image DB 305 for the image data similar to the image data to which the reliability is added.

If it is determined that there is no similar image data (NO in step S1801), the system control unit 302 ends the process without changing the reliability.

On the other hand, if it is determined that there is similar image data (YES in step S1801), the process proceeds to step S1802.

In step S1802, the system control unit 302 determines whether there is a peak in the distribution of the positional information added to each of one or more similar image data pieces.

If the system control unit 302 determines that there is no peak (NO in step S1802), the system control unit 302 ends the process without changing the reliability.

If the system control unit 302 determines that there is one or more peaks (YES in step S1802), the process proceeds to step S1803. In step S1803, the system control unit 302 determines whether the frequency of each peak is greater than or equal to a predetermined value. If the system control unit 302 determines that the frequencies of all peaks is less than a predetermined value (NO in step S1803), the system control unit 302 ends the process without changing the reliability.

If the system control unit 302 determines that the frequency of one or more peaks is greater than or equal to a predetermined value (YES in step S1803), the process proceeds to step S1804. In step S1804, the system control unit 302 calculates the distance between the position PO indicating the positional information associated with the image data to which the reliability is to be added, and the position of the peak whose frequency is greater than or equal to the predetermined value. The system control unit 302 then determines whether there is a position of a peak which is a closer than a predetermined distance from the position PO and whose frequency is greater than or equal to the predetermined value.

If the system control unit 302 determines that there is the position of the peak which is closer than the predetermined distance from the position PO and whose frequency is greater than or equal to the predetermined value (YES in step S1804), the process proceeds to step S1805. In step S1805, the system control unit 302 increases the reliability. For example, the system control unit 302 adds a value of 0.5 to the reliability.

On the other hand, if he system control unit 302 determines that there is no position of the peak which is closer than the predetermined distance from the position P0 and whose frequency is greater than or equal to the predetermined value (NO in step S1804), the process proceeds to step S1806. In step S1806, the system control unit 302 decreases the reliability. For example, the system control unit 302 adds the value of −0.5 to the reliability.

According to the above-described method, the reliability is calculated using the positional information distribution. As a result, the reliability of higher accuracy can be calculated based on the positional information of the similar image data that have been previously photographed.

(4) A METHOD FOR CALCULATING THE RELIABILITY USING THE CONTRAST INFORMATION

The method for calculating the reliability using the contrast as the photographic information will be described below. Such a method uses the tendency of the contrast becoming lower when a book is photographed as compared to when an actual object is photographed. If the contrast acquired from the image data is lower than a predetermined value, the reliability is set low. On the other hand, if the contrast acquired from the image data is higher than the predetermined value, the reliability is set high.

Figure 19:
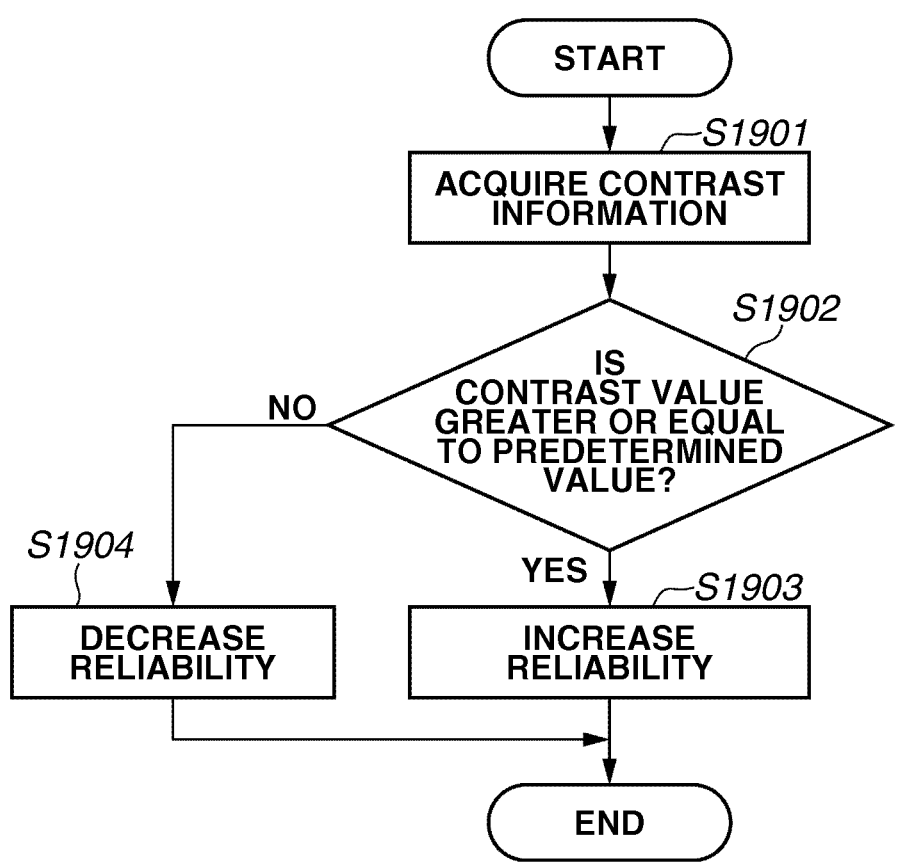
FIG. 19 is a flowchart illustrating a process for calculating the reliability using contrast information according to the fourth exemplary embodiment of the present invention.

FIG. 19 is a flowchart illustrating the method for calculating the reliability using the contrast information. The process for calculating the reliability using the contrast information will be described below with reference to the flowchart illustrated in FIG. 19.

In step S1901, the system control unit 112 or the system control unit 302 acquires the contrast information from the image data.

In step S1902, the system control unit 112 or the system control unit 302 determines whether the value of the contrast acquired in step S1901 is greater than or equal to a predetermined value.

If the system control unit 112 or the system control unit 302 determines that the value of the contrast is greater than or equal to the predetermined value (YES in step S1902), the process proceeds to step S1903. In step S1903, the system control unit 112 or the system control unit 302 increases the reliability to be added to the image data. For example, the value to be added to the reliability becomes 0.5.

If the system control unit 112 or the system control unit 302 determines that the value of the contrast is less than the predetermined value (NO in step S1902), the process proceeds to step S1904. In step S1904, the system control unit 112 or the system control unit 302 decreases the reliability to be added to the image data. For example, the value to be added to the reliability becomes −0.5.

According to the above-described method, the reliability is calculated using the contrast information. As a result, if the contrast is low, it is determined that the object is a printed product, so that the reliability can be set low.

(5) A METHOD FOR CALCULATING THE RELIABILITY USING THE FLICKER DETECTION

The above-described exemplary embodiments described the methods for determining whether the camera is photographing a printed product. A similar issue occurs when the camera photographs an image on a television. The method for calculating the reliability based on the result of detecting the flicker and the scanning lines when photographing, which is a method for solving such an issue, will be described below.

The flicker may be generated when the image displayed on the television screen is updated at regular intervals (i.e., a refresh rate). In particular, the flicker is easily generated in an image which is displayed using an interlace method. The interlace method displays the scanning lines, i.e., lines that vertically divide the image to be displayed, by separating to odd number scanning lines and even number scanning lines. In flicker detection, if the difference between the average values of the luminance evaluation values in each photographed image is greater than or equal to a predetermined value, the flicker is determined to exist.

Further, according to the present exemplary embodiment, the scanning lines are detected based on whether there is a strip-shaped area having a constant luminance value at regular intervals in the luminance value of each pixel in the image. The methods for detecting the flicker and the scanning lines are not limited to the above-described methods as long as it can be determined whether the flicker or the scanning lines exist.

Figure 20:
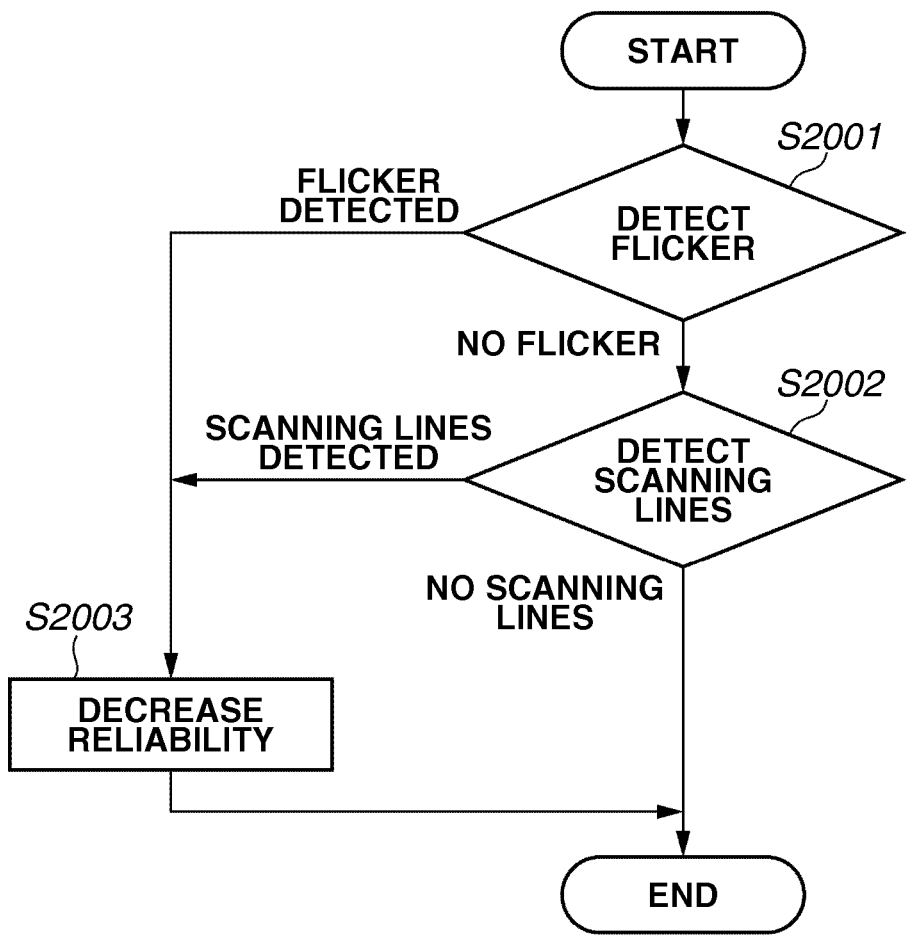
FIG. 20 is a flowchart illustrating a process for calculating the reliability using flicker detection and scanning line detection according to the fourth exemplary embodiment of the present invention.

FIG. 20 is a flowchart illustrating the method for setting the reliability using the flicker detection and the scanning lines. The method for setting the reliability using the flicker detection and the scanning lines detection will be described below with reference to the flowchart illustrated in FIG. 20.

In step S2001, the system control unit 112 or the system control unit 302 performs flicker detection with respect to the image data to which the reliability is added, and determines whether the flicker is detected.

If the system control unit 112 or the system control unit 302 detects the flicker (FLICKER DETECTED in step S2001), the process proceeds to step S2003.

If the system control unit 112 or the system control unit 302 does not detect the flicker (NO FLICKER in step S2001), the process proceeds to step S2002. In step S2002, the system control unit 112 or the system control unit 302 performs scanning lines detection with respect to the image data, and determines whether the scanning lines are detected.

If the system control unit 112 or the system control unit 302 does not detect the scanning lines (NO SCANNING LINES in step S2002), the system control unit 112 or the system control unit 302 ends the process without changing the reliability.

If the system control unit 112 or the system control unit 302 detects the scanning lines (SCANNING LINES DETECTED in step S2002), the process proceeds to step S2003.

In step S2003, the system control unit 112 or the system control unit 302 decreases the reliability to be added to the image data. For example, the value to be added to the reliability becomes −0.5.

According to the above-described method, the reliability is calculated using the flicker detection and scanning lines detection. As a result, the reliability can be appropriately set even if an output product such as a television in addition to the printed product is photographed.

(6) A METHOD FOR CALCULATING THE RELIABILITY USING THE STATE OF THE FOCUS LENS

The method for calculating the reliability using the state of the focus lens, i.e., the photographic information, will be described below. The method is based on the fact that the focus position of the lens is often at a macro photographing position when photographing an output product.

Figure 21:
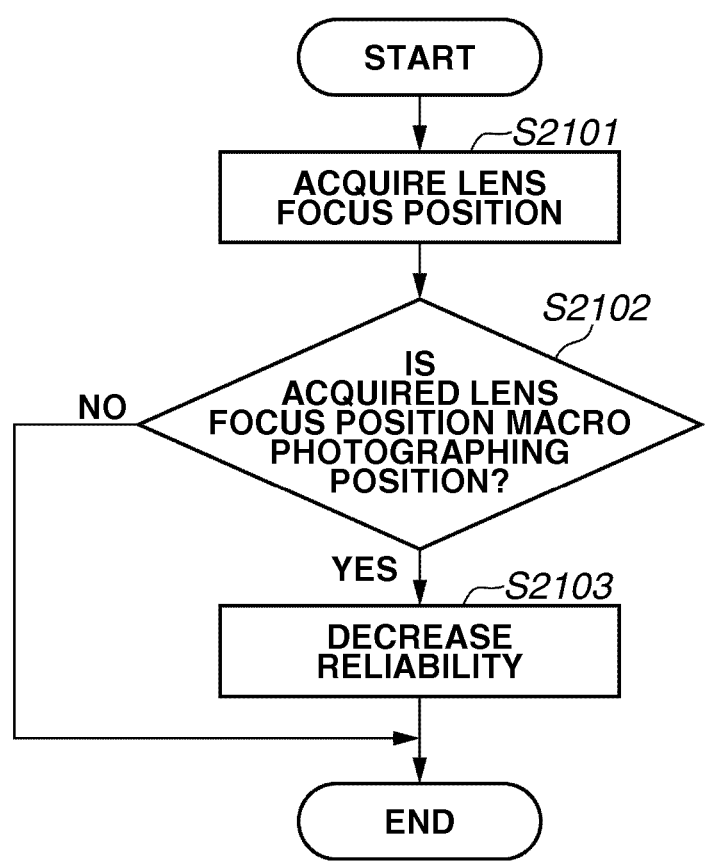
FIG. 21 is a flowchart illustrating a process for calculating the reliability using a state of a focus lens according to the fourth exemplary embodiment of the present invention.

FIG. 21 is a flowchart illustrating the method for calculating the reliability using the state of the focus lens. The process for calculating the reliability using the state of the focus lens will be described below with reference to the flowchart illustrated in FIG. 21.

In step S2101, the system control unit 112 or the system control unit 302 acquires the information indicating the focus position of the lens from the camera. The system control unit 112 or the system control unit 302 may also acquire the information indicating the focus position of the lens from the metadata of the photographed image data.

In step S2102, the system control unit 112 or the system control unit 302 determines whether the acquired information indicating the focus position indicates a macro photographing position.

If the system control unit 112 or the system control unit 302 determines that the acquired information indicating the focus position indicates the macro photographing position (YES in step S2102), the process proceeds to step S2103. In step S2103, the system control unit 112 or the system control unit 302 decreases the reliability. For example, the value to be added to the reliability becomes −0.5.

If the system control unit 112 or the system control unit 302 determines that the acquired information indicating the focus position does not indicate the macro photographing position (NO in step S2102), the system control unit 112 or the system control unit 302 ends the process without changing the reliability.

According to the above-described method, the reliability is calculated using the state of the focus lens. As a result, if the focus position is in the macro photographing position, it is determined that the object is not the actual object, so that the reliability can be set low.

According to the present exemplary embodiment, there are various methods for calculating the reliability. Each of the above-described methods may be singularly used, or may be combined as described in the first, second, and third exemplary embodiments. The reliability can thus be more appropriately calculated. As a result, positional information of higher accuracy can be provided to the camera 200.

According to the above-described exemplary embodiments, the reliability is automatically recorded in the metadata of the image data. However, if the reliability is automatically calculated, an intended result may not be acquired. For example, a scene is assumed in which paintings that cover the entire wall in an art museum are to be photographed. If a painting, i.e., an actual object, is photographed, the object may not be determined as an actual object due to the close distance, the flatness, and the difficulty of the contrast to become high indoors. In other words, although the association between the positional information added to the image data to be acquired and the content of the image data is high, the reliability may be set low.

To solve such an issue, according to a fifth exemplary embodiment, if the reliability is set low, the user can arbitrarily change the reliability. As a result, the user can correct the reliability even when the intended reliability is not calculated, so that an appropriate reliability can be added to the image data.

Three method for changing the reliability will be described below, i.e., (1) a method for allowing the user to change the reliability when the reliability is to be recorded in the metadata of the image data, (2) a method for allowing the user to change the reliability when the image data to which the reliability is added is transmitted from the camera 100 to the server 300, and (3) a method for allowing the user to change the reliability when viewing the image data to which the reliability is added.

(1) A METHOD FOR ALLOWING THE USER TO CHANGE THE RELIABILITY WHEN THE RELIABILITY IS RECORDED IN THE METADATA OF THE IMAGE DATA

The method for allowing the user to change the reliability by notifying, when the reliability is to be recorded in the metadata of the image data, the user that the reliability to be recorded is less than or equal to a predetermined value, will be described below.

Figure 22:
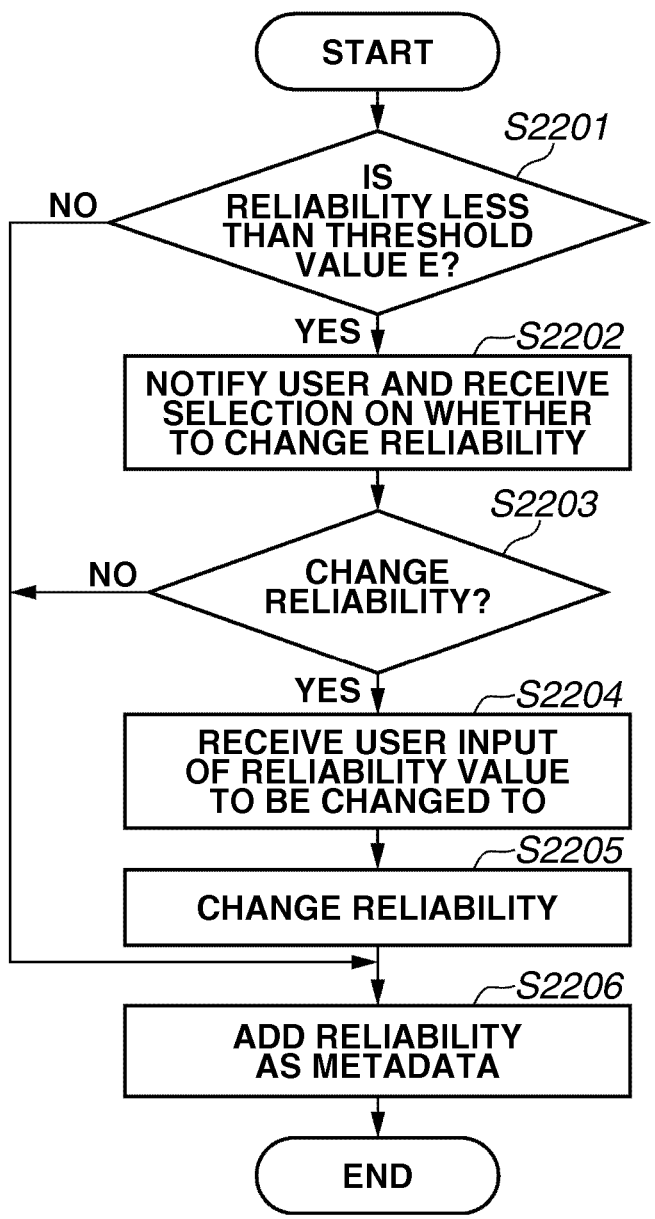
FIG. 22 is a flowchart illustrating a process for adding reliability of a camera according to a fifth exemplary embodiment of the present invention.

FIG. 22 is a flowchart illustrating a process for recording the reliability in the metadata of the image data. The processes illustrated in the flowchart is performed instead of the processes performed in step S405 in FIG. 4A, step S1207 in FIG. 12, or step S1305 in FIG. 13.

In step S2201, the system control unit 112 or the system control unit 302 determines whether the calculated reliability is less than a threshold value E. If the system control unit 112 or the system control unit 302 determines that the calculated reliability is less than the threshold value E (YES in step S2201), the process proceeds to step S2202. If the system control unit 112 or the system control unit 302 determines that the calculated reliability is greater than or equal to the threshold value E (NO in step S2201), the process proceeds to step S2206.

In step S2202, the system control unit 112 or the system control unit 302 notifies the user of the reliability being less than the threshold value E. For example, the camera 100 notifies the user by displaying on the display unit 113 a message such as "the reliability of the positional information of the image is less than the threshold value".

In step S2203, the system control unit 112 or the system control unit 302 receives a selection by a user operation on whether to change the reliability. For example, the camera 100 displays on the display unit 113 a message such as "Do you change the reliability?" and prompts the user to select. The user can thus select whether to change the reliability by operating on the operation unit 114.

If the user selects not to change the reliability (NO in step S2203), the process proceeds to step S2206.

On the other hand, if the user selects to change the reliability (YES in step S2203), the process proceeds to step S2204. In step S2204, the system control unit 112 or the system control unit 302 receives a user input of an arbitrary value of the reliability. For example, the system control unit 112 in the camera 100 may display on the display unit 113 a message such as "Please input the reliability". The user can input a value of the reliability by operating on the operation unit 114.

In step S2205, the system control unit 112 or the system control unit 302 sets the reliability to be added to the image data to the value of the reliability received in step S2204.

In step S2206, the system control unit 112 or the system control unit 302 adds the reliability set in step S2205 as the metadata of the image data.

According to the above-described method, control is performed to allow the user to change the reliability when the reliability is added as the metadata of the image data.

As a result, an appropriate reliability can be added by the user correcting the reliability even when the intended reliability has not been calculated.

(2) A METHOD FOR ALLOWING THE USER TO CHANGE THE RELIABILITY WHEN THE IMAGE DATA TO WHICH THE RELIABILITY IS ADDED IS TRANSMITTED FROM THE CAMERA 100 TO THE SERVER 300

The method for allowing the user to change the reliability by notifying, when the image data to which the reliability is already recorded as the meta data is transmitted from the camera 100 to the server 300, the user that the recorded reliability is less than or equal to the predetermined value will be described below.

Figure 23:
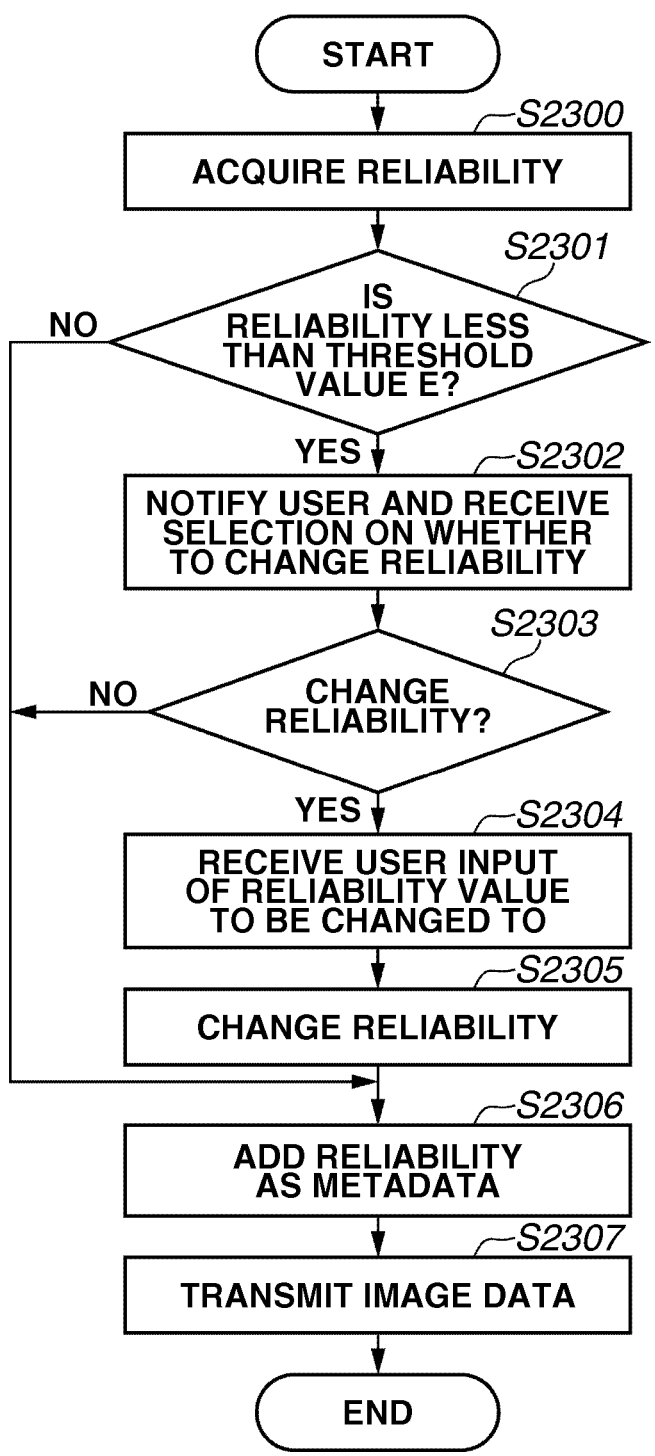
FIG. 23 is a flowchart illustrating a process for adding the reliability of the camera according to the fifth exemplary embodiment of the present invention.

FIG. 23 is a flowchart illustrating a process in which the reliability of the image data to which the reliability is already added as the metadata can be changed and then be transmitted. The process illustrated in the flowchart is performed in place of the process performed in step S407 in FIG. 4B or in step S1208 in FIG. 12B.

Referring to FIG. 23, the process is step S2300 is performed before step S2301 in which a similar process as in step S2201 in FIG. 22 is performed, and the process in step S2307 is performed after step S2306 in which the similar process as in step S2206 is performed. The processes performed in step S2301 to step S2306 are similar to those performed in step S2201 to step S2206 illustrated in FIG. 22.

In step S2300, the system control unit 112 acquires the reliability from the image data.

In step S2301 to step S2306, the system control unit 112 performs the processes similar to those performed in step S2201 to step S2206 in FIG. 22.

In step S2307, the system control unit 112 performs control to transmit to the server 300, the image data to which the reliability is added in step S2306.

According to the above-described example, the control is performed so that the user can change the reliability when the image data to which the reliability is added is transmitted to an external device.

As a result, the reliability of the positional information recorded in the metadata of the image data can be changed when the image data is transmitted to outside the camera.

(3) A METHOD FOR ALLOWING THE USER TO CHANGE THE RELIABILITY WHEN VIEWING THE IMAGE DATA TO WHICH THE RELIABILITY IS ADDED

The method for allowing the user to change the reliability when the user is viewing, using the camera 100 or the server 300, the image data to which the reliability is recorded will be described below. An example in which the user uses the camera 100 to view the image data will be described below.

Figure 24:
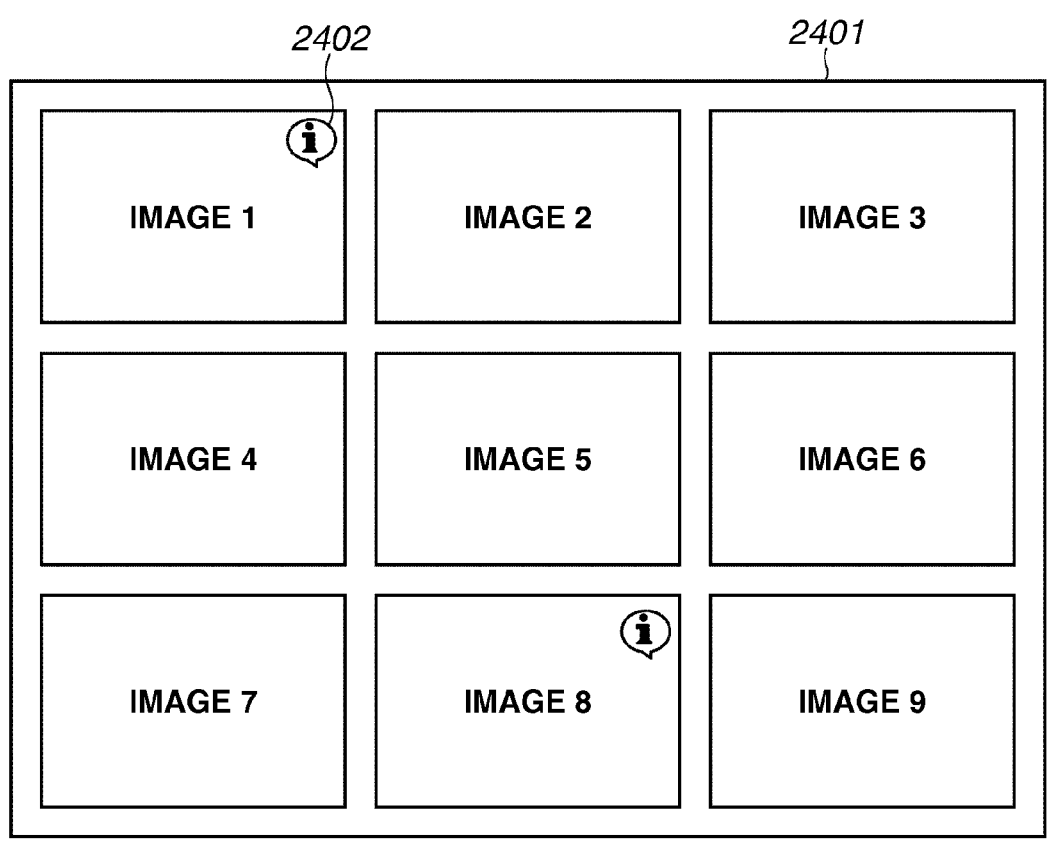
FIG. 24 illustrates an example of a display screen displayed on a display unit of the camera according to the fifth exemplary embodiment of the present invention.

FIG. 24 illustrates an example of a display screen displayed on the display unit 113 of the camera 100 when the user is viewing the image data pieces recorded in the recording media 108. Referring to FIG. 24, a display screen 2401 displays the image data pieces (i.e., images 1 to 9) recorded in the recording media 108. An icon 2402 is displayed on an upper right portion of the image 1. The icon 2402 indicates that the reliability added to the image data is less than the threshold value E.

In the present example, the reliabilities added to the image 1 and the image 8 are less than the threshold value E. The user can select the icon via the operation unit 114. If the user selects the icon, the reliability is acquired from the metadata of the image data to which the icon is attached, and the processes illustrated in step S2202 and thereon in the flowchart of FIG. 22 are then performed.

As a result, if the reliability recorded as the metadata of the image data is less than the threshold value E, the reliability can be changed at the timing in which the user can view the image data. The reliability can thus be corrected after photographing.

The example in which the user views the image data recorded in the recording media 108 in the camera 100 is described above. However, a similar method can be applied when the user views the image data stored in the image recording unit 304 in the server 300.

As described above, according to the present exemplary embodiment, the calculated reliability can be changed.

According to the above-described exemplary embodiments, reliability which indicates the level of the association between the positional information indicating the position of the camera 100 when photographing and the content of the photographed image data is generated. The reliability is then recorded as the metadata of the image data. As a result, the positional information of higher accuracy can be provided.

The method for calculating the reliability is not limited to the above-described methods, and may be any method as long as it can be determined whether the image data is acquired by photographing an actual object or photographing an output product.

According to the above-described exemplary embodiments, the initial value of the reliability is set to 0.5, and values of +0.5 to −0.5 are added in each of the calculation methods. However, the initial value and the added values are not limited to such values. Further, according to the above-described exemplary embodiments, a predetermined value is added to the initial value of the reliability in each of the calculation methods. However, reliability of a predetermined value may be set by performing each calculation method.

Furthermore, according to the above-described exemplary embodiments, the maximum value of the reliability is set to 1.0, and the minimum value to 0.0. However, the values are not limited to the above. Moreover, according to the above-described exemplary embodiments, the reliability is expressed by a level indicated by a numerical value. However, the reliability may be expressed by a level other than the numerical value. For example, the reliability may be expressed using codes such as A, B, and C.

According to the above-described exemplary embodiments, the focusing method is performed based on nine focusing points. However, the focusing method is not limited to this configuration. The focusing points may be more than or less than nine points, and may be changed according to the resolution of the pixels in the image data.

According to the above-described exemplary embodiments, the collected image data pieces are stored in the database in the server 300. However, it is not necessary to store the image data in the database. For example, only a feature amount extracted from the image data and a path of the image data may be stored in the database.

According to the above-described exemplary embodiments, the reliability is directly recorded in the image data as the metadata. However, if the reliability is configured so that it can be associated with the image data, the reliability may be managed as separate data (file).

Each of the above-described exemplary embodiments is an example of a method for realizing the present invention, and may be corrected or changed as appropriate, according to a configuration of an apparatus to which the present invention is to be applied or various conditions. Further, each exemplary embodiment may be combined as appropriate.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-195634 filed Sep. 1, 2010, which is hereby incorporated by reference herein in its entirety.

What is claimed is:

1. An image processing apparatus comprising:
   a first acquisition unit configured to acquire positional information indicating a photographing position where an object has been photographed;
   a second acquisition unit configured to acquire photographic information based on photographic image data of the object;
   a determination unit configured to determine a reliability value which indicates how the positional information indicates a photographing position of contents expressed by the photographic image data based on the photographic information acquired by the second acquisition unit; and
   an associating unit configured to associate the reliability value determined by the determination unit with the photographic image data of the object,
   wherein the determination unit is configured to determine the reliability value by determining whether the photographic image data is image data acquired by photographing a flat object or not based on the photographic information acquired by the second acquisition unit, and wherein, the determination unit is configured, if the photographic image data is determined to be acquired by photographing a flat object, to bring the reliability value close to a value indicating a minimum level of reliability.

2. The image processing apparatus according to claim 1, further comprising:

a photographing unit configured to photograph the object to acquire the photographic image data of the object; and a recording unit configured to record on a recording medium, the photographic image data associated with the reliability value by the associating unit, wherein the first acquisition unit is configured to acquire the positional information by calculating the photographing position of the object based on information from an external device.

3. The image processing apparatus according to claim 1, further comprising:

a third acquisition unit configured to read from a recording medium, the photographic image data associated with the reliability value, the positional information, and the photographic information, wherein the first acquisition unit is configured to acquire the positional information associated with the photographic image data of the object acquired by the third acquisition unit, and wherein the second acquisition unit is configured to acquire the photographic information associated with the photographic image data of the object acquired by the third acquisition unit.

4. The image processing apparatus according to claim 1, wherein the photographic information includes at least one of object distance information indicating a distance between a position of an object and a position of the image processing apparatus when photographing the object, and a focus position of a lens.

5. The image processing apparatus according to claim 1, wherein the photographic information includes at least one of information indicating luminance distribution of the image, information indicating whether there is flicker, information indicating whether there are scanning lines, and information about contrast of the image.

6. The image processing apparatus according to claim 1, further comprising a changing unit configured to change the reliability value determined by the determination unit.

7. The image processing apparatus according to claim 6, wherein the changing unit is configured to change the reliability if the reliability value is less than a predetermined value.

8. The image processing apparatus according to claim 1, further comprising a display unit configured to display, if the reliability value associated with the photographic image data is less than a predetermined value, an icon indicating that the reliability is less than the predetermined value along with the photographic image data.

9. The image processing apparatus according to claim 1, wherein the photographic information includes at least one of object distance information indicating a distance between a position of an object and a position of the image processing apparatus when photographing the object, and a focus position of a lens; and wherein the determination unit is configured to determine the reliability value based on at least one of object distance information indicating a distance between a position of an object and a position of the image processing apparatus when photographing the object, and the focus position of a lens.

10. The image processing apparatus according to claim 1, wherein the photographic information includes at least one of information indicating luminance distribution of the image, information indicating whether there is flicker, information indicating whether there are scanning lines, and information about contrast of the image; and wherein the determination unit is configured to determine the reliability value based on at least one of information indicating luminance distribution of the image, information indicating whether there is flicker, information indicating whether there are scanning lines, and information about contrast of the image.

11. A method for controlling an image processing apparatus, the method comprising:

acquiring positional information indicating a photographing position where an object has been photographed;

acquiring photographic information based on photographic image data of the object;

determining a reliability value which indicates how the acquired positional information indicates a photographing position of contents expressed by the photographic image data based on the acquired photographic information; and associating the determined reliability value with the photographic image data of the object, wherein the reliability value is determined by determining whether the photographic image data is image data acquired by photographing a flat object or not based on the photographic information, and wherein, if the photographic image data is determined to be acquired by photographing a flat object, the reliability value is brought close to a value indicating a minimum level of reliability.

12. A non-transitory storage medium storing computer-executable instructions, the computer-executable instructions causing a computer to execute the method according to claim 11.

* * * * *